United States Patent [19]

Harmon, Jr. et al.

[11] 4,438,492

[45] Mar. 20, 1984

[54] INTERRUPTABLE MICROPROGRAM CONTROLLER FOR MICROCOMPUTER SYSTEMS

[75] Inventors: William J. Harmon, Jr., San Jose; John R. Mick, Cupertino; Vernon Coleman, Oakland, all of Calif.

[73] Assignee: Advanced Micro Devices, Inc., Sunnyvale, Calif.

[21] Appl. No.: 174,323

[22] Filed: Aug. 1, 1980

[51] Int. Cl.³ .............................................. G06F 3/04
[52] U.S. Cl. ...................................... 364/200; 364/900
[58] Field of Search ... 364/200 MS File, 900 MS File

[56] References Cited

U.S. PATENT DOCUMENTS

| | | | |
|---|---|---|---|
| 3,766,524 | 10/1973 | Maring et al. | 364/200 |
| 3,821,715 | 6/1974 | Hoff, Jr. | 364/200 |
| 3,839,705 | 10/1974 | Davis et al. | 364/200 |
| 3,972,030 | 7/1976 | Bailey, Jr. | 364/200 |
| 4,080,652 | 3/1978 | Cronshaw | 364/200 |
| 4,087,852 | 5/1978 | Campbell | 364/200 |
| 4,115,852 | 9/1978 | Rozell | 364/200 |

Primary Examiner—Gareth D. Shaw
Assistant Examiner—D. Rutherford
Attorney, Agent, or Firm—Patrick T. King; Gary T. Aka

[57] ABSTRACT

A microprogram controller, in a microcomputer system used as an address sequencer intended for controlling the sequence of execution of microinstructions in a microprogram memory, is presented. The microprogram controller includes architecture that provides the capability to asynchronously receive indications of an event, break from the microinstruction sequence in response, branch to control of subroutine consisting of a predetermined microinstruction sequence directed to responding to the event, and returning to the interrupted sequence upon completion of the subroutine.

10 Claims, 35 Drawing Figures

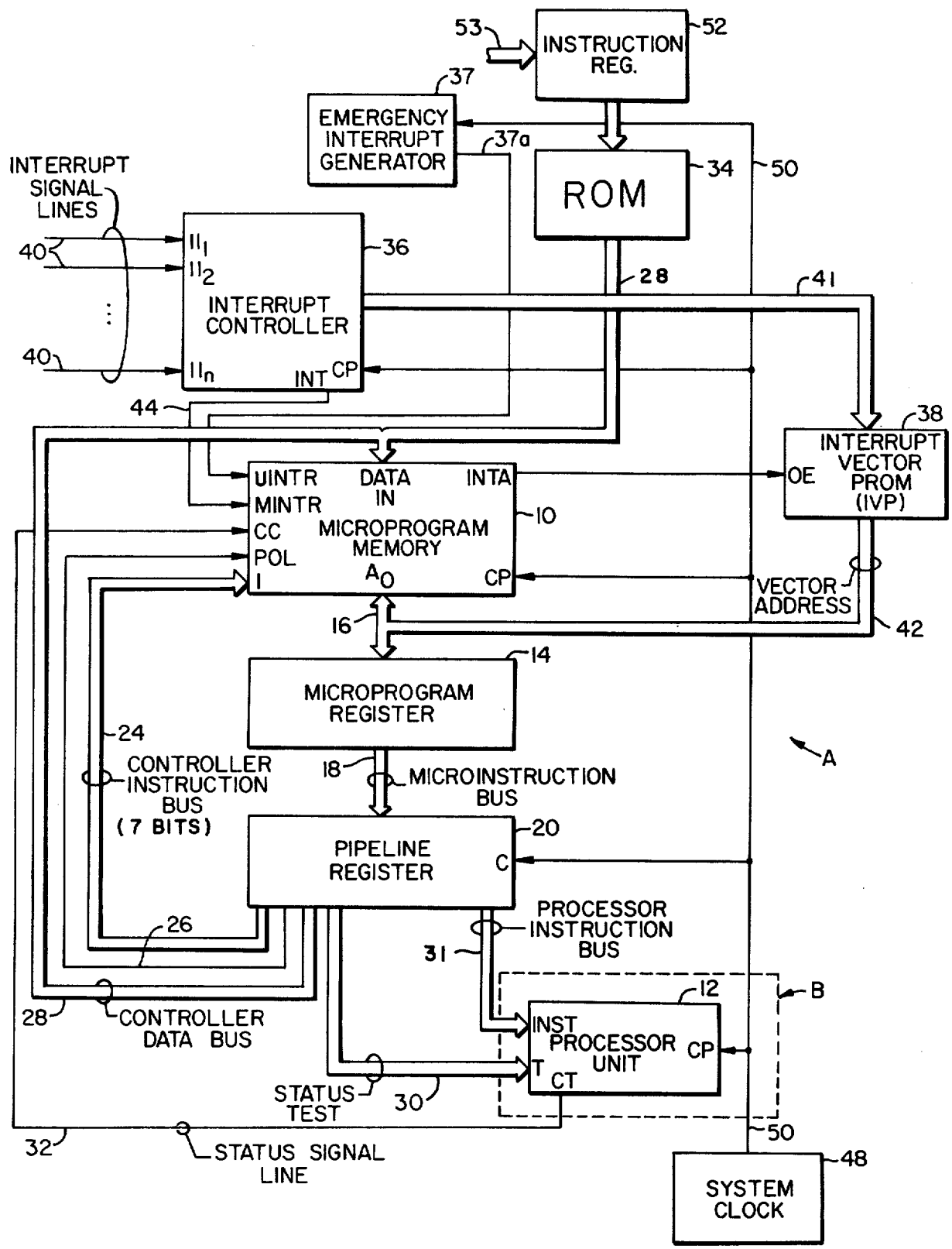
FIG._1.

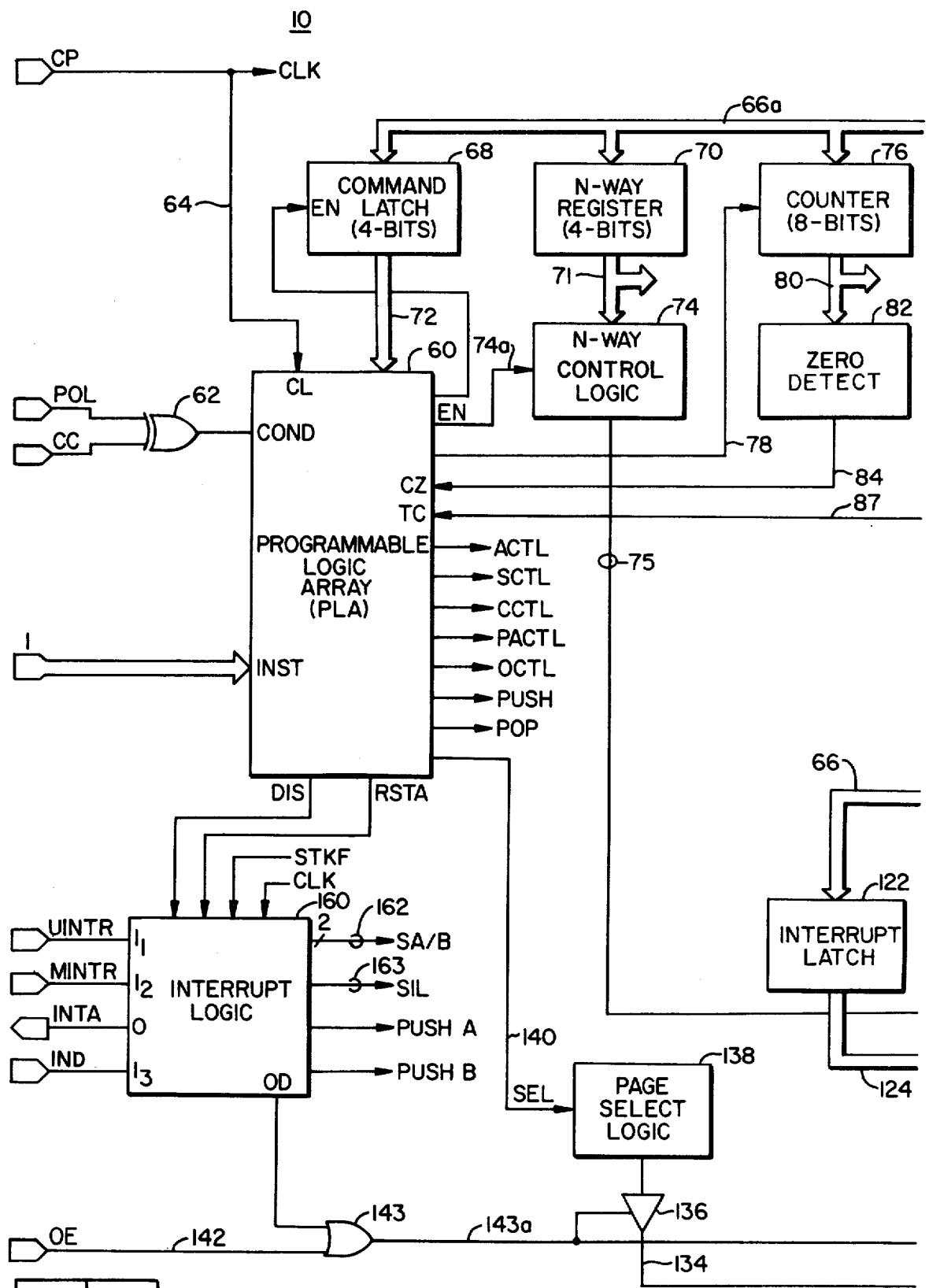
FIG._2A.

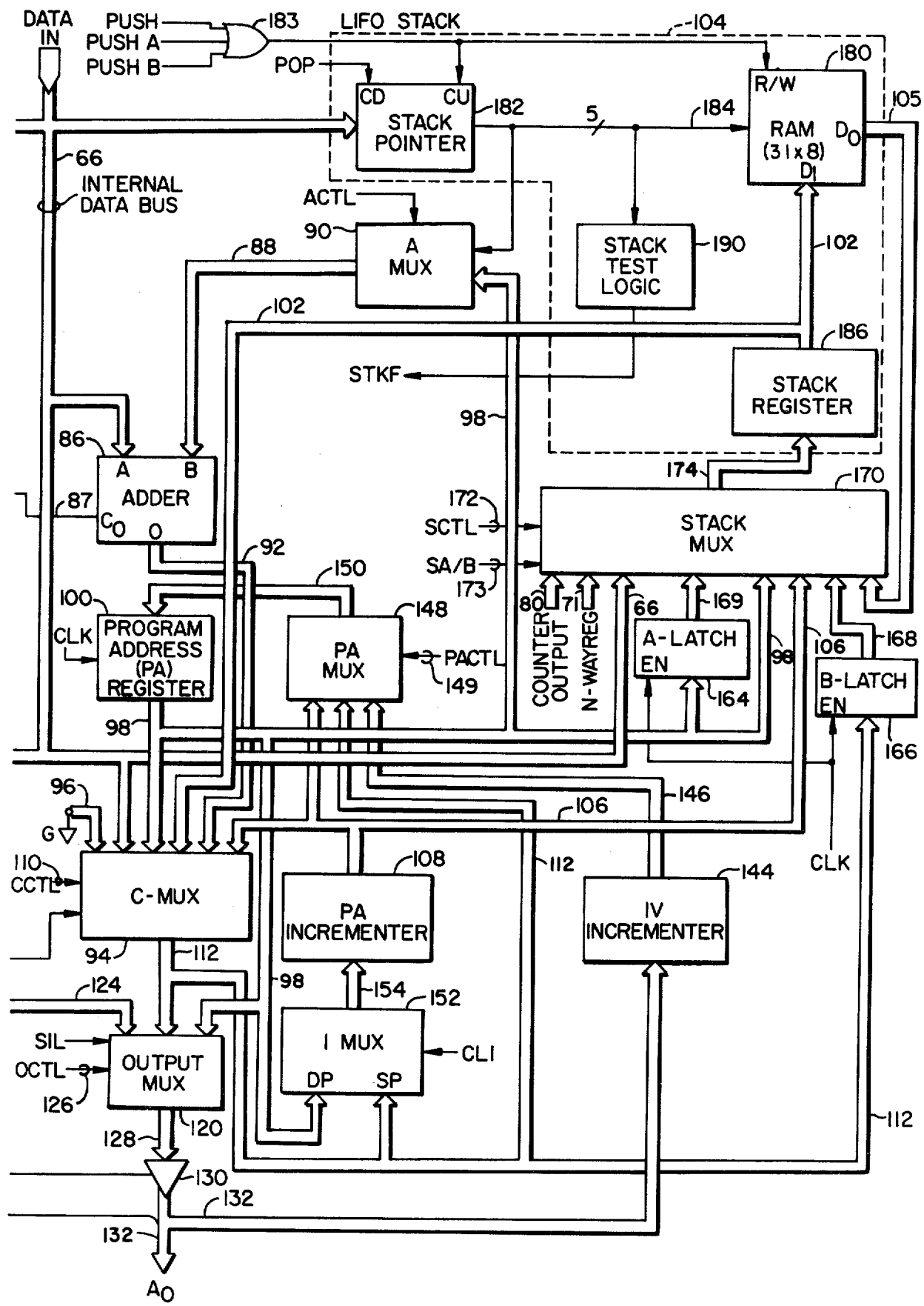
FIG._2B.

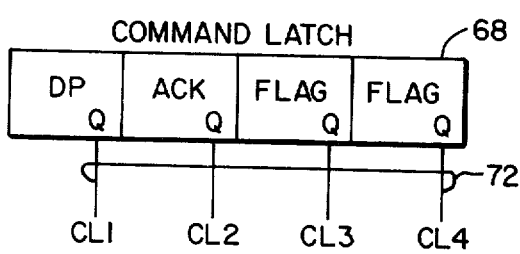
FIG._3.
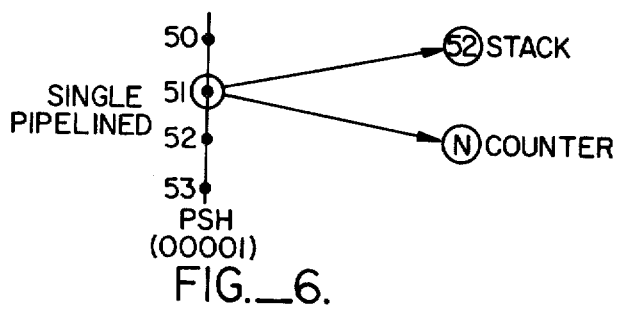
FIG._6.
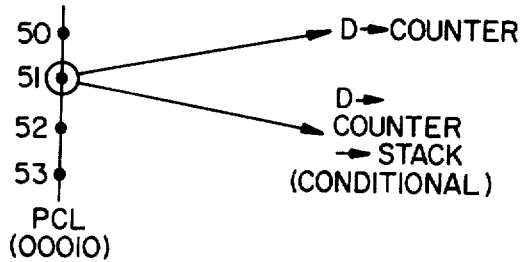
FIG._7.
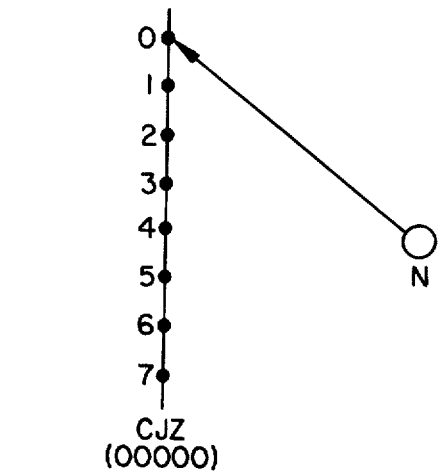
FIG._5.
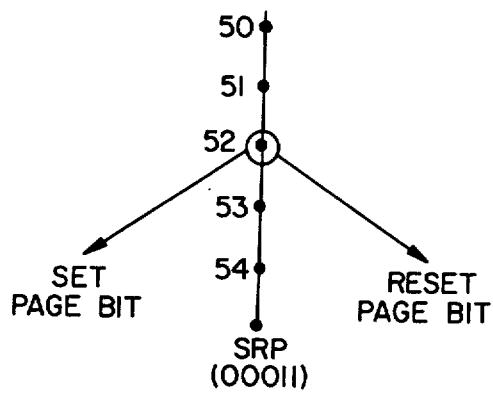
FIG._8.
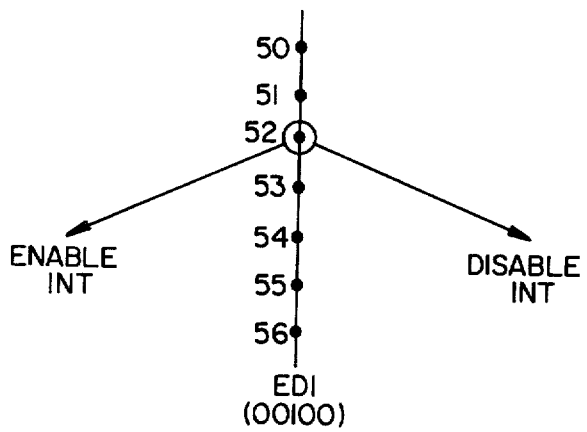
FIG._9.
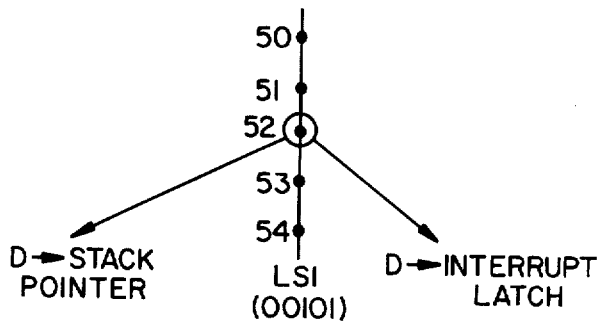
FIG._10.

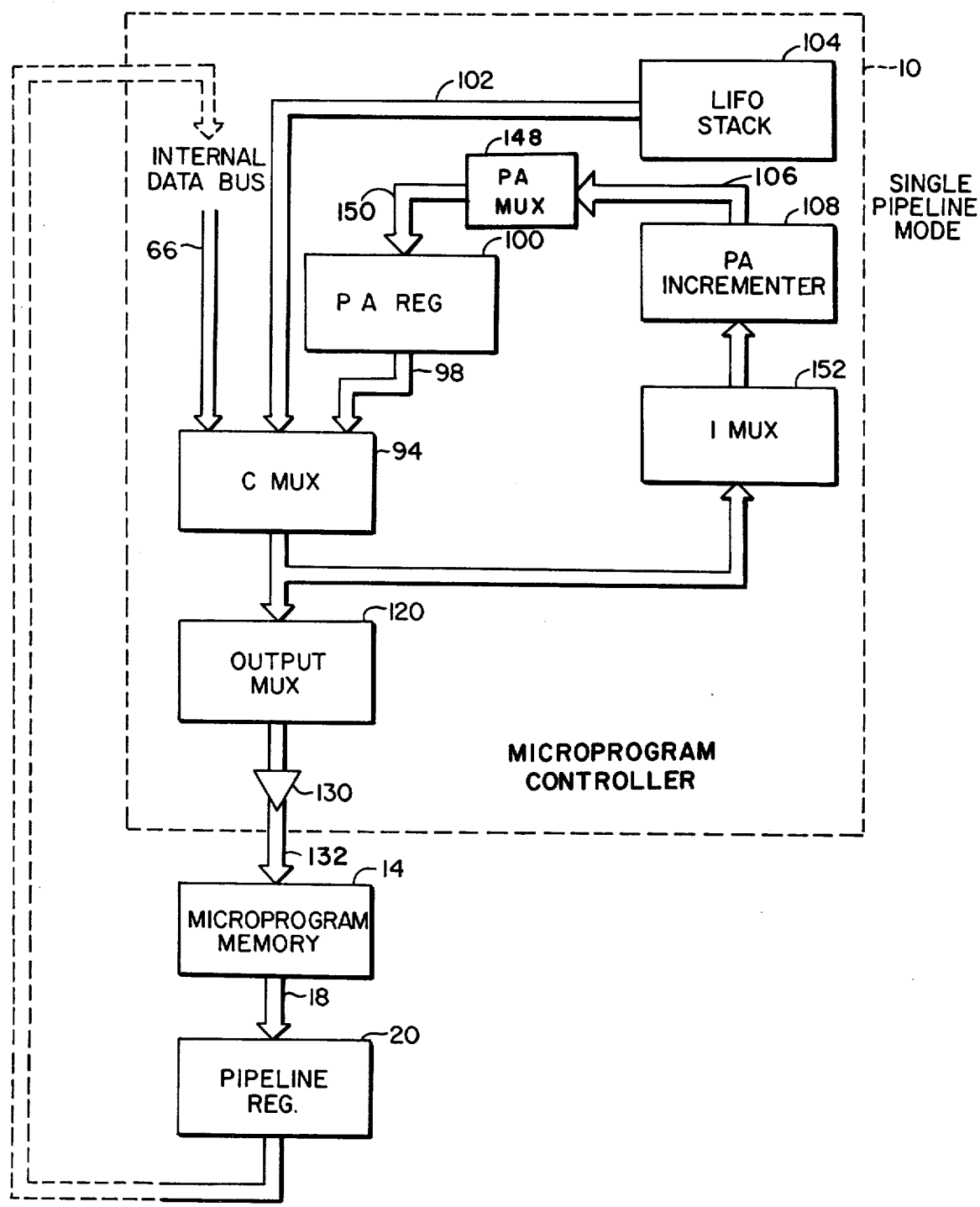
FIG._4A.

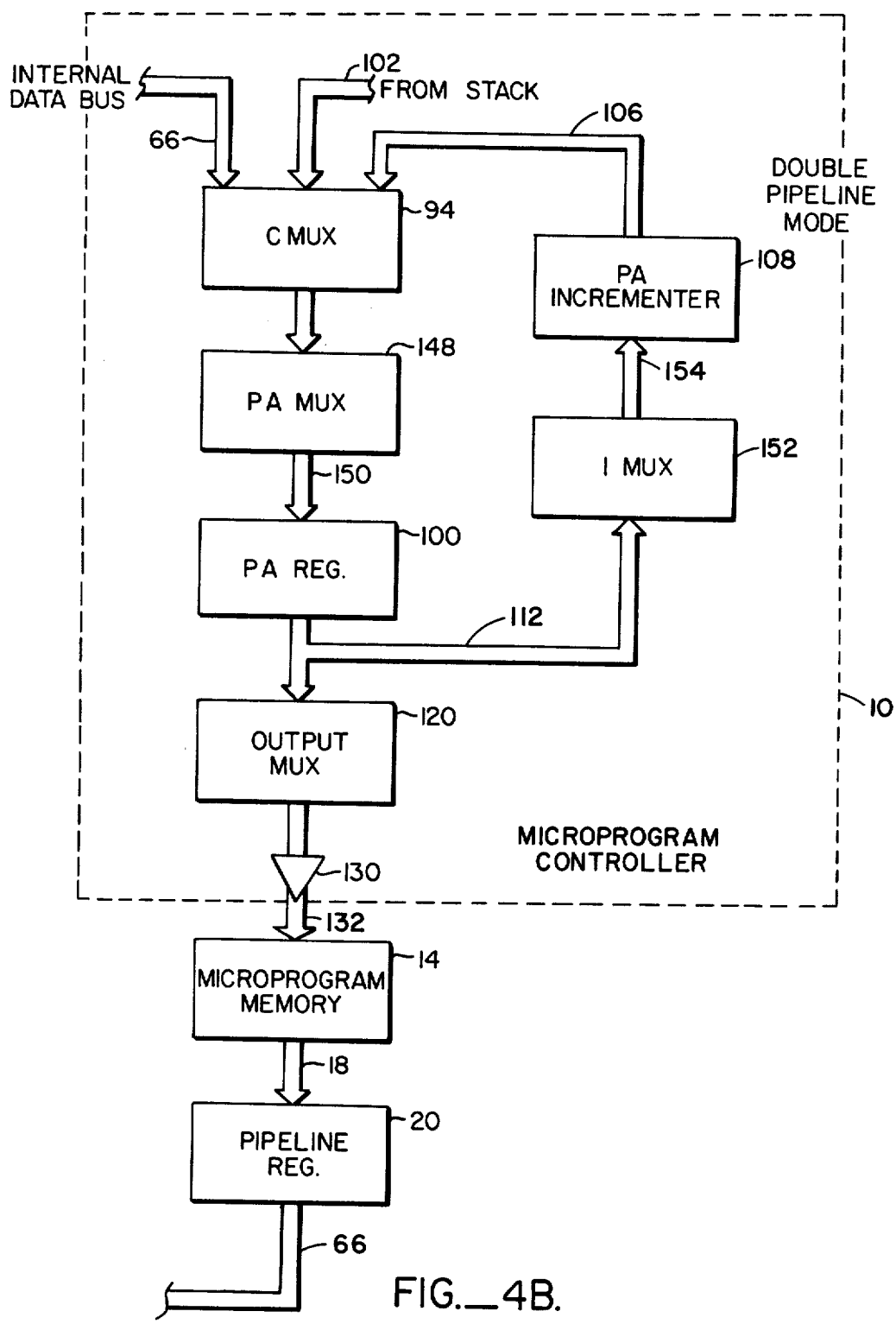
FIG._4B.

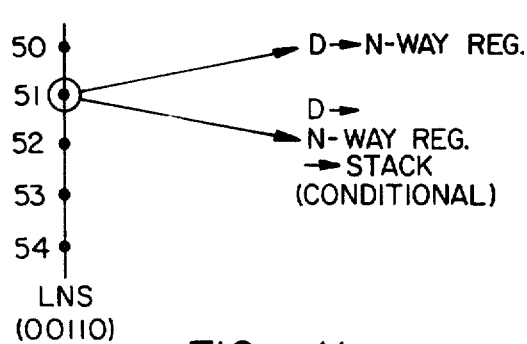
FIG._11.
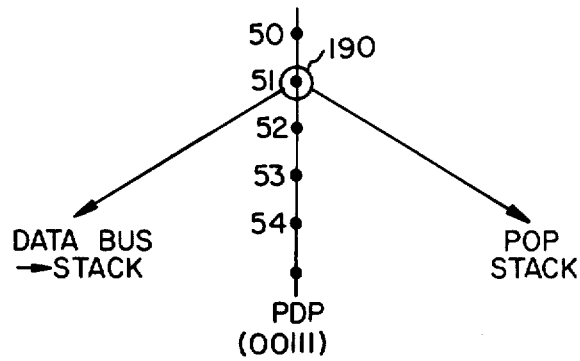
FIG._12.
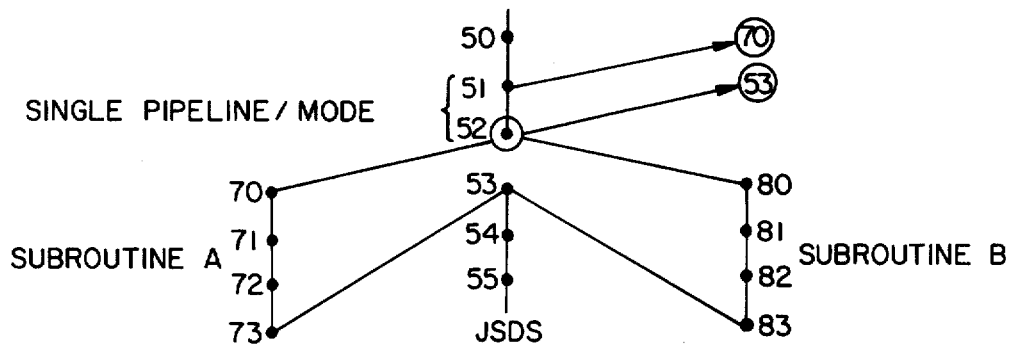
FIG._13A.
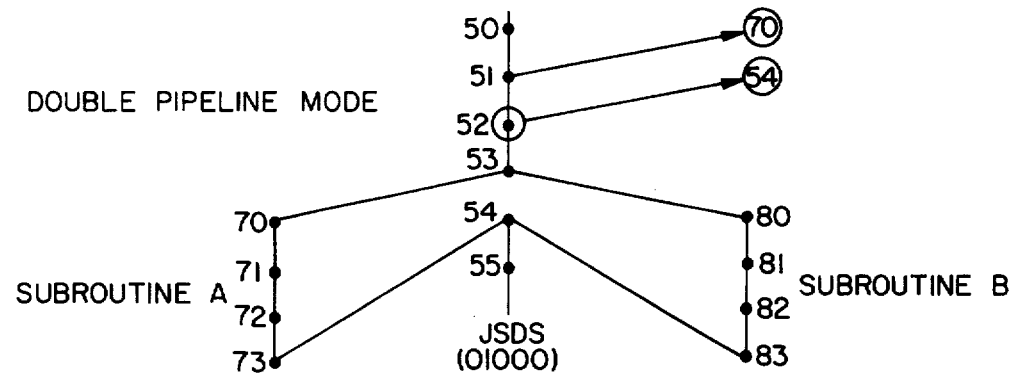
FIG._13B.
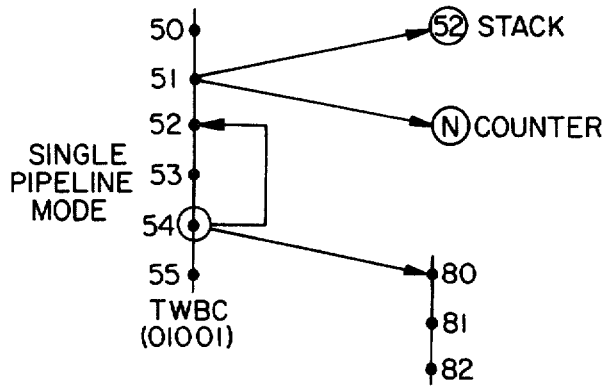
FIG._14A.
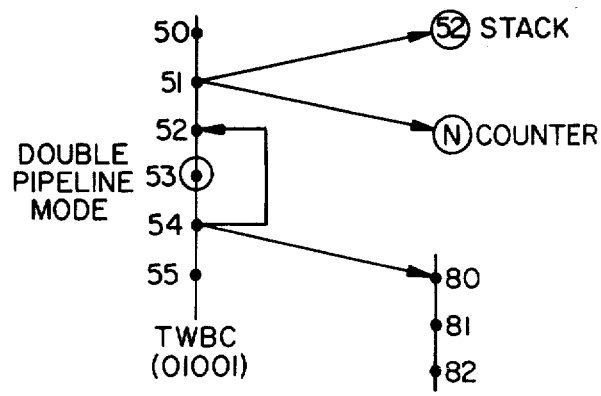
FIG._14B.

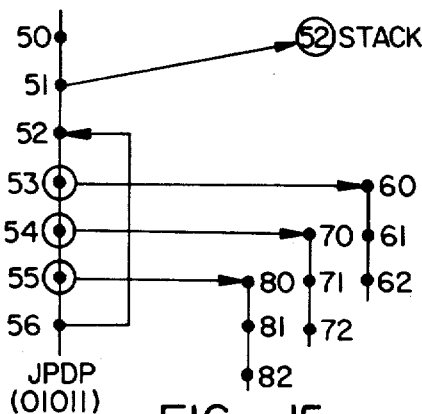
FIG._15.
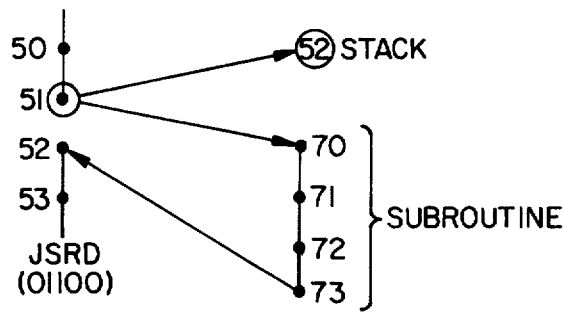
FIG._16.
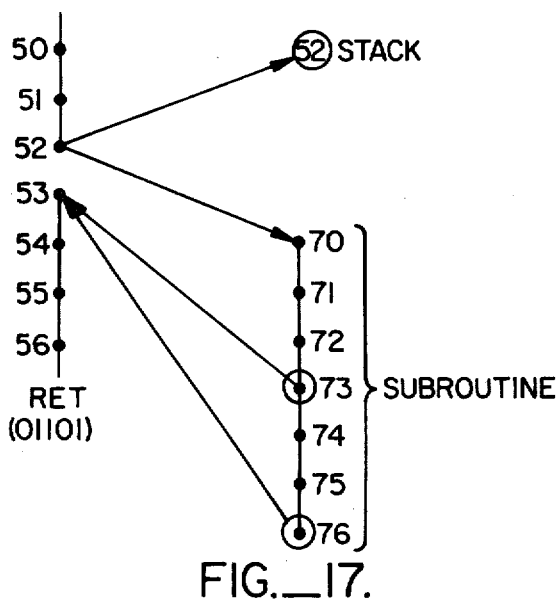
FIG._17.
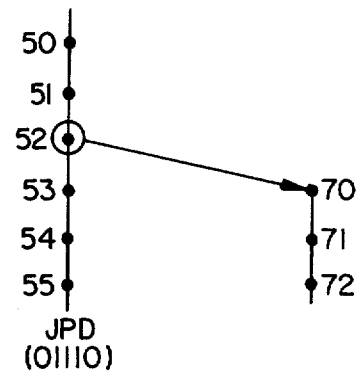
FIG._18.
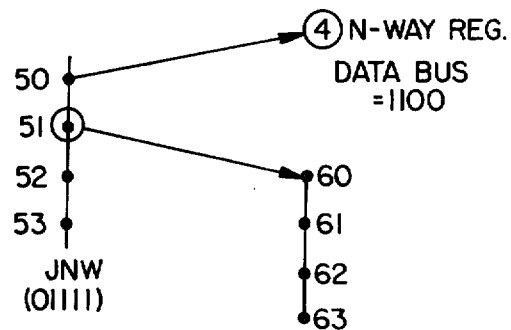
FIG._19.
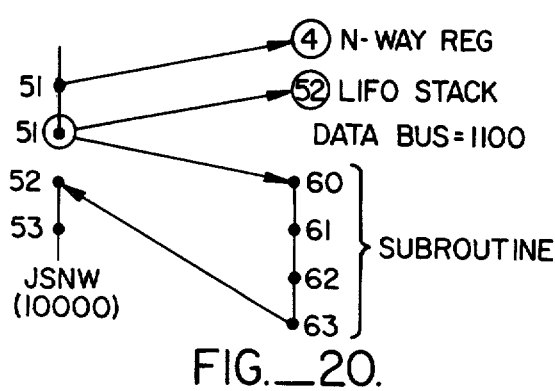
FIG._20.
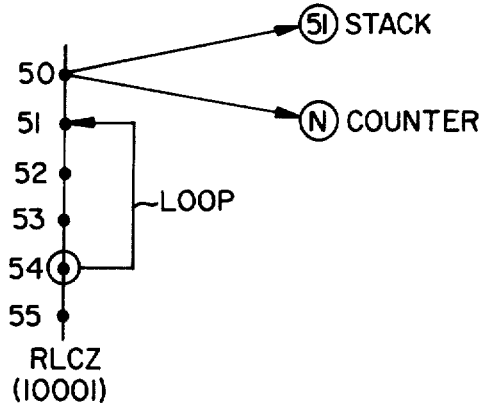
FIG._21.

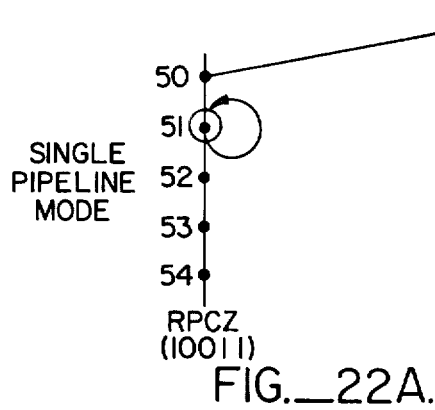
FIG._22A.
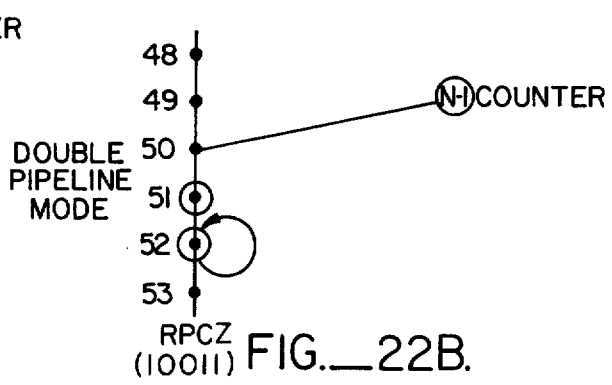
FIG._22B.
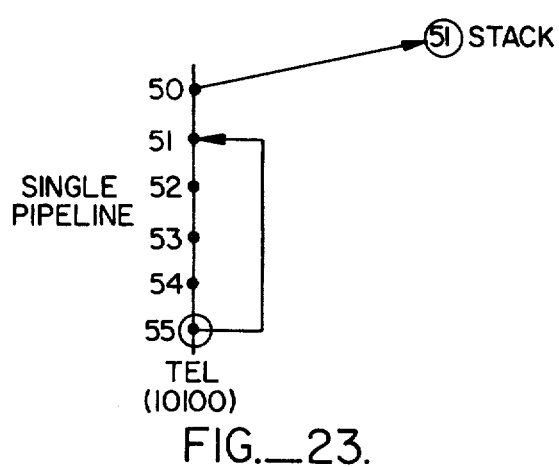
FIG._23.
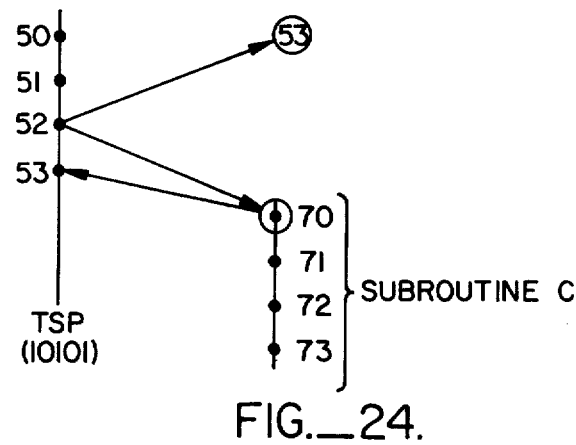
FIG._24.
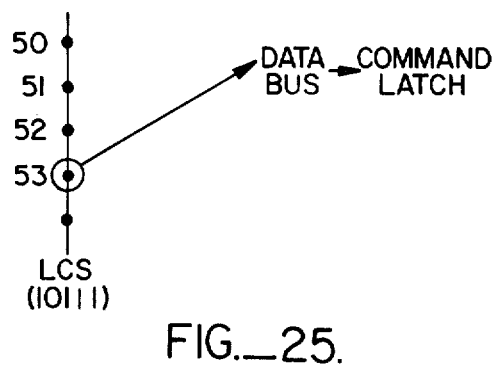
FIG._25.
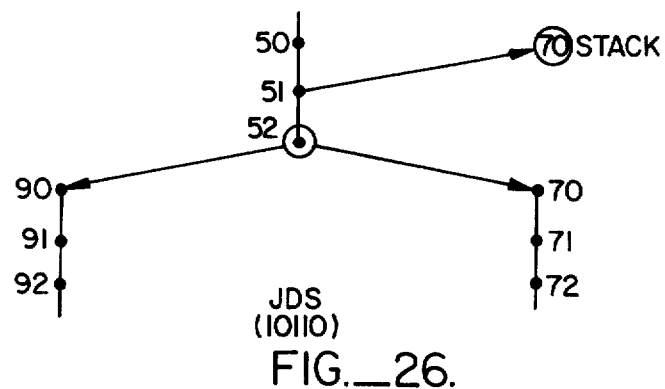
FIG._26.

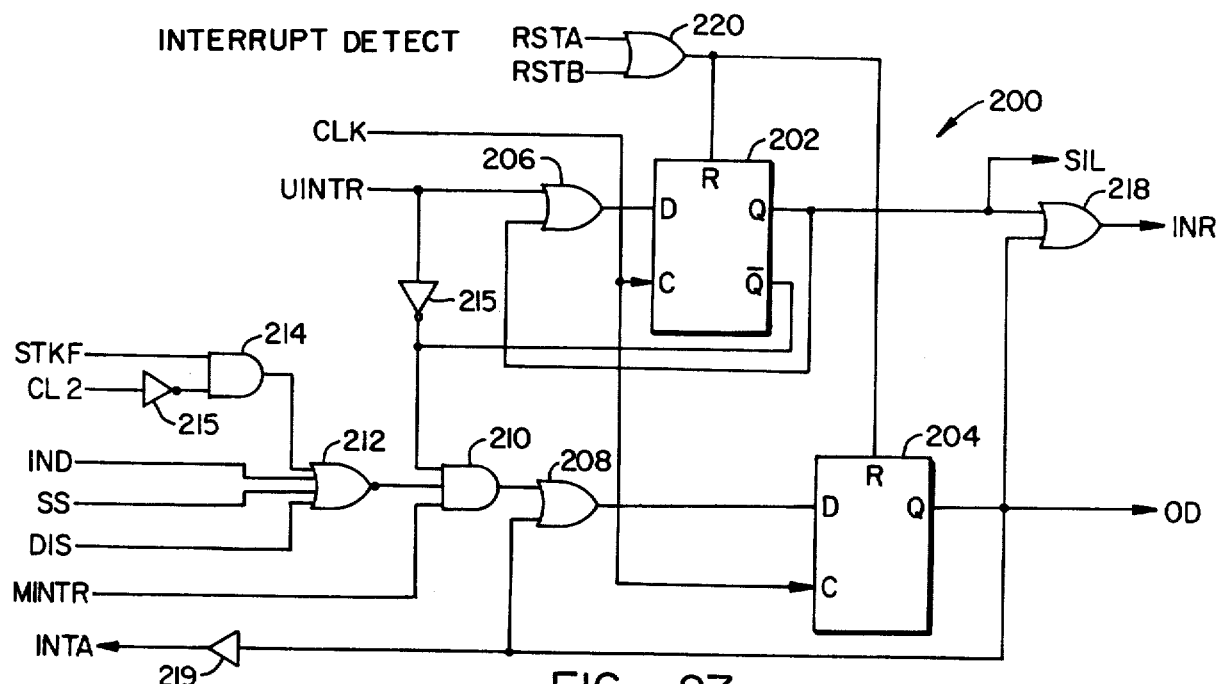
FIG._27.
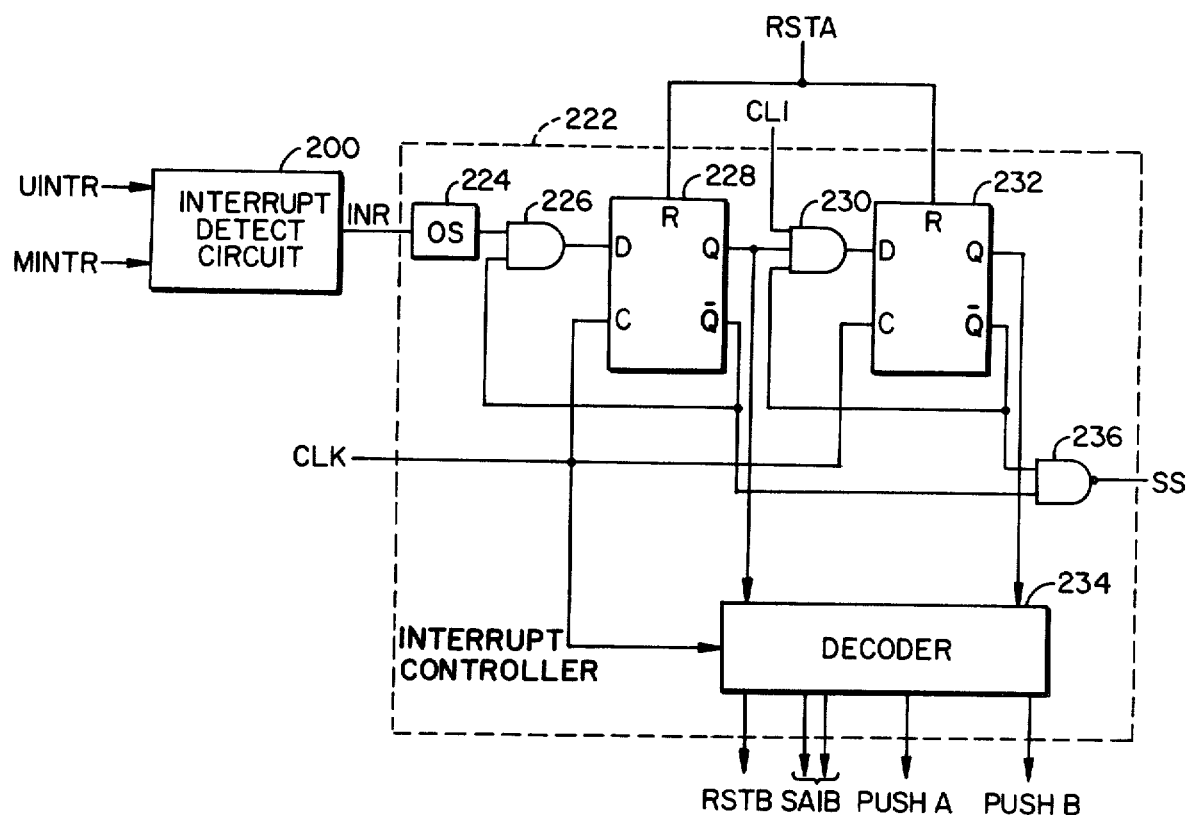
FIG._28.

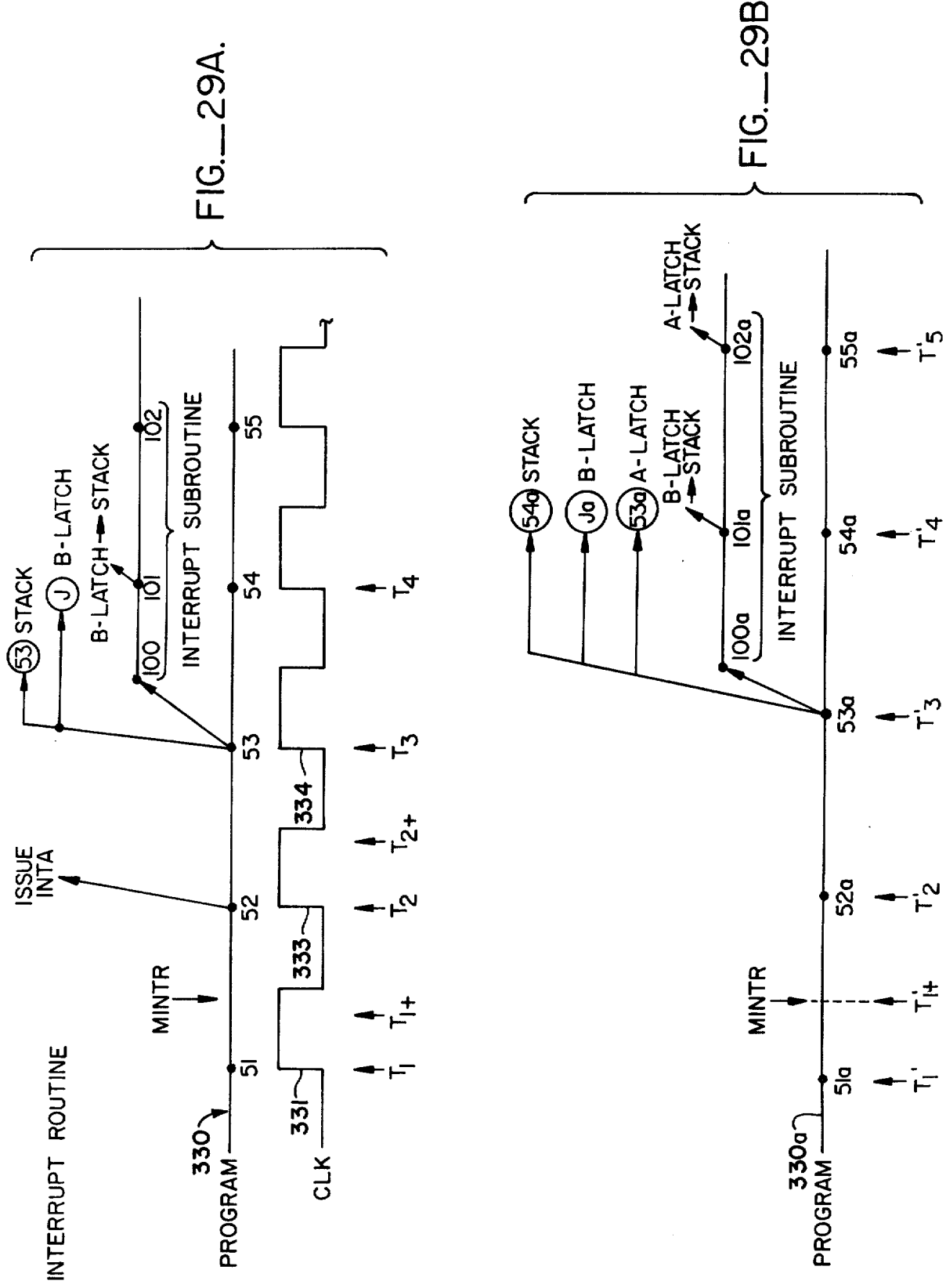

INTERRUPTABLE MICROPROGRAM CONTROLLER FOR MICROCOMPUTER SYSTEMS

This invention relates generally to a microprogram controller for use in a high speed, high performance microcomputer system as an address sequencer intended for controlling the sequence of execution of microinstructions stored in a microprogram memory, and more particularly to a microprogram controller that includes interrupt handling capability.

BACKGROUND OF THE INVENTION

Recent semiconductor fabrication techniques have provided for the packaging of complex digital circuits for use as building block elements in microcomputer systems. For example, approximately ten years ago, it was possible to fabricate a single semiconductor element, called an integrated circuit (IC) or "chip", with a marked increase in digital circuitry (i.e., AND or OR gates, flip-flops, etc.) density. These ICs or chips were used as counters, decoders, multiplexers, latches, and the like. Thus, the chips became building block elements of a larger system.

More recently, however, semiconductor fabrication techniques have realized much higher circuit density. For example, metal-oxide-silicon (MOS) semiconductor chips now have a circuit density sufficient to realize a (micro)computer on a single chip. These microcomputers have been found as being particularly useful building blocks themselves in large scale data processing systems. For example, such microcomputer building blocks are now frequently used to provide peripheral units with a modicum of "intelligence" so that when called upon to receive or transmit data to a host computer, the call requires a minimum of time and control by the host computer. Thus, the host computer is relieved of many of the control functions necessary to guide the peripheral unit in its chores.

However, as the host computer, and the overall data processing system it may control, becomes faster and faster with today's technology, the simplicity and speed with which peripheral control operations are implemented become critical. If the overall data processing system with which the peripheral is used is kept waiting for a data or instruction transfer, speed of the overall system is impaired. In fact, the point has been reached in today's technology that MOS microcomputers do not have sufficient speed and performance.

Thus, a user turns to microcontroller systems that are fabricated from bipolar technology (usually, emitter-coupled-logic (ECL)) which can obtain speeds much higher than MOS circuits. However, bipolar technology cannot realize the circuit density obtained by MOS technology; but this, in itself, provides an advantage. Bipolar fabricated microcomputer system architecture is divided into two subsystems: control circuitry that supervises microprogram flow, and data manipulation circuitry that processes data.

Typically, the control circuitry includes a microprogram memory which contains microinstructions. Each microinstruction comprises a plurality of bits to control each of the data manipulation elements of the microcomputer system. In addition, a device or devices, termed a sequencer or microprogram controller, is used to issue addresses that are applied to the microprogram memory to access the microinstruction sequence to be executed. In peripheral controller operation, the microcomputer is often faced with the requirement for the efficient synchronization and response to asynchronous events such as power failure, machine malfunctions, control panel service requests, external timer signals, and input/output device service requests. Handling these asynchronous events, in terms of response time, systems throughput, hardward costs, and memory space required, is a true measure of the performance of the system.

One approach to handling asynchronous events is to incorporate circuitry that provides a status indicator associated with each possible asynchronous event. The microcomputer system then tests each indicator in sequence and, in effect, "asks" if service is required. This is typically referred to as the "polling" method and is often microprogram software implemented. This polling method, however, consumes time, microprogram memory space. System throughput is decreased, response time increased, and microprogram memory space that could otherwise be used for additional purposes dedicated to handling responses to these asynchronous events.

Asynchronous events can also be handled via what is termed an "interrupt" technique whereby the event generates a request signal. The microcomputer system, upon receipt of the request signal, may suspend the program it is presently executing, execute an event service routine, then resume execution of the suspended program. This method, at the additional expense of circuitry, is preferred, particularly in high performance operating systems. The microcomputer is not burdened with having to poll all status signals. Rather, a service routine is executed only when requested. Thus, the system is more efficient since response time is faster; and it is this low response time that is sought by the high performance data processing systems of today.

Yet, there still exists certain problems and disadvantages using the interrupt technique with today's available bipolar microcomputer systems. Presently, additional circuitry is necessary and the sequencer must be programmed to take the time to service the interrupt request circuitry itself.

Further, in order to attain the highest possible speed with which the microprogram memory is accessed, two level "pipelining" techniques are used. These techniques typically insert, in the serial address generating stream, an additional register. The additional register holds the address that is presently applied to the microprogram memory, while the next microinstruction address is being generated. This technique increases the speed of operation, but is more difficult to program because the selection of a microinstruction occurs two instructions ahead of its execution. Further, the ability to service interrupts when operating in a two level pipeline mode can become extremely complex.

SUMMARY OF THE INVENTION

The present invention is directed to a microprogram controller that includes interrupt circuitry to allow the controller to quickly and easily handle the servicing of asynchronous events without disrupting individual microprogram instruction sequences. Interrupt handling is performed so that the controller can operate in both normal (single pipeline mode) or two level pipeline mode. The overall controller architecture is structured so that it can be fabricated as a single integrated circuit.

According to the present invention, a microprogram controller, used as an address sequencer intended for controlling the sequence of execution of microinstructions stored in a microprogram memory, is provided with circuitry that automatically allows the controller to branch to a predetermined subroutine in response to a request for asynchronous event handling (hereinafter "interrupt"). The controller includes circuitry for generating sequential addresses that are applied to the microprogram memory for accessing a sequential set of microinstructions, a program address register that holds the generated address, a random-access-memory (RAM) and interrupt handling logic circuitry. When an interrupt is received, the interrupt logic determines whether the interrupt can be serviced and, if so, stores information presently used by the controller to allow it to return to the present program after a subroutine has been executed to handle the interrupt.

The controller is structured to operate in a single pipeline or a (faster) double pipeline mode with interrupt handling capability equally available to both.

For a fuller understanding of the nature and advantages of the invention, reference should be had to the ensuring detailed description taken in conjunction with the accompanying drawings.

BRIEF DESCRIPTION OF THE DRAWINGS

FIG. 1 illustrates a microcomputer system utilizing the interruptable microprogram controller of the present invention;

FIGS. 2A and 2B are block diagrams of the microprogram controller of the present invention;

FIG. 3 is a representation of the command register used in the invention of FIGS. 2A and 2B;

FIGS. 4A and 4B illustrate, respectively, single and double pipeline modes of operation of the present invention;

FIGS. 5-26 are examples of the instructions executed by the invention of FIGS. 2A and 2B;

FIG. 27 is a circuit diagram of the interrupt detect logic used in the interrupt logic of the present invention;

FIG. 28 is a circuit diagram of the interrupt controller used in the interrupt logic of the present invention; and FIG. 29 is a diagram illustrating the interrupt routine performed by the present invention to branch to an interrupt subroutine.

DESCRIPTION OF THE PREFERRED EMBODIMENT

A. General

Many small computers today are designed utilizing what is called microprogramming. In microprogrammed systems, a large portion of the system's control is performed utilizing a read-only-memory (ROM) rather than large arrays of gates and flip-flops. This technique frequently reduces the package count in the microcomputer system and provides a highly ordered structure, not present when random logic is used. Moreover, microprogramming makes changes in the machine's instruction set very simple to perform, reducing post production engineering costs for the system substantially.

FIG. 1 illustrates a typical microcomputer system architecture and, as illustrated, can be divided into two distinct sections: a control section A and a data manipulation section B. The control section A has, as its heart, the microprogram controller of the present invention, generally designated with the reference numeral 10. The data manipulation section B includes the processor device 12 and, perhaps, other circuitry not shown (such as a subsidiary memory). The data manipulation section would process data, performing whatever operations are required, in response to a sequence of instructions conducted thereto on a processor instruction bus 31. It is to the control of this sequence of instructions that the microprogram controller 10 is directed.

The microprogram controller functions to generate addresses that control the sequence of microinstruction that ultimately issue from the microprogram memory 14. The addresses generated by the microprogram controller 10 are conducted on an address bus 16 to the address circuits (not shown) of the microprogram memory 14. With the application of such microinstruction addresses, the microprogram memory 14 will issue, on an microinstruction bus 18, microinstructions, usually of a word length on the order of 64 or more bits.

The microinstruction bus 18 conducts the microinstructions to the data inputs of a pipeline register 20, which accepts and temporarily holds the microinstruction. While the microinstruction is contained in the pipeline register 20, output lines of the register go out to the system elements. A portion of the microinstruction is returned to the sequencer to determine the address of the next microinstruction to be executed. That next address is computed by the microprogram controller 10, conducted to the microprogram memory 14 via the address bus 16, and the next microinstruction sits at the input of the pipeline register 20.

Those portions of the microinstruction that are returned to the microprogram controller 10 include a 7-bit controller instruction word, conducted on a controller instruction bus 24, a polarity control bit communicated on a signal line 26, and a multi-bit data word that is conducted on a controller data bus 28 to the data bus inputs of the controller 10.

The processor section A can also communicate information to the microprogram controller 10. For example, a processor unit 12 may generate signals that can be placed on the condition test (CT) output of the processor unit 12. More typically, the processor unit 12 includes circuitry that can multiplex a plurality of condition test signals to the CT OUTPUT in response to either an instruction communicated to the instruction (INST) inputs or a specific status test request applied to the test (T) inputs of the processor unit 12 via a status test bus 30. The test signal appearing at the CT output of the processor unit 12 is applied to the condition code (CC) input of the microprogram controller 10, via the status signal line 32, where it is used to conditionally modify the address that will be presented to the microprogram memory 14.

Microinstruction addresses may also be obtained from a mapping read-only-memory (ROM) 34 which is connected by the controller data bus 28 to the DATA IN inputs of the microprogram controller 10. The mapping ROM 34 typically contains the starting routine address and is itself addressed by the output of the instruction register 52. The instruction register 52, in turn, is provided with a "machine instruction" from, for example, the main memory (not shown) of a larger computing system via bus lines 53. The machine instruction is performed by executing several of the microinstruction (stored in the microprogram memory 14) in sequence.

The circuitry used for handling interrupts would include, in a typical system such as FIG. 1, an interrupt controller 36 and an interrupt vector prom 38. The interrupt controller 36 would receive at its interrupt inputs ($II_1, II_2, \ldots, II_n$), via corresponding signal lines 40, interrupt signals from individual peripheral units, requesting some type of servicing (i.e., data transfers, reading switches, etc.). The interrupt controller 36, when an interrupt signal is received at one of its $II_1$-$II_n$ inputs, formulates a multibit word identifying the particular unit requesting servicing. The formulated word is conducted on the signal lines 41 to the IVP 38. Each memory location of the IVP 38 contains an address of each sequence of microinstructions contained in the microprogram memory 14 needed for servicing the individual interrupts. Accordingly, the coded word generated by the interrupt controller 36 and conducted on the signal lines 41 is applied to the address circuits of the IVP 38. In turn, the IVP communicates the address of the first microinstruction of the needed interrupt handling subroutine via the vector address bus 42, which interconnects with the address bus 16 via tri-state buffering.

At the same time, the interrupt controller 36 issues an interrupt signal from its interrupt (INT) output, which is conducted to a maskable interrupt (MINTR) input of the microprogram controller 10 via a signal line 44. As will be seen, the signal received by the microprogram controller 10 at its MINTR input will cause it to initiate a storage routine to store information presently contained in various registers of the controller 10 to enable it to return to the present microinstruction sequence at the proper place.

The vector address communicated from the IVP 38 is applied to the microprogram memory 14 and the microinstruction for the subroutine needed to handle the interrupt requesting servicing is loaded into the pipeline register 20. As with all microinstructions, portions of the microinstruction contained in the pipeline register 20 are returned to microprogram controller 10 to allow it to control the sequence of microinstructions of the interrupt subroutine. When the interrupt has been serviced, a last microinstruction will cause the microprogram controller to effect a return to the program sequence of address generation from which it "jumped."

Interrupt signals may also be generated by other elements of the microcomputer system. For example, emergency situations such as power failures, error indications and the like, may be required to be handled differently by the microprogram controller 10. Accordingly, an emergency interrupt generator may be included to generate a signal that is conducted on the signal line 37a unmaskable interrupt (UINTR) input of the microprogram controller 10.

In order to effect synchronous operation of the microcomputer system of FIG. 1, a system clock 48 is provided that generates clock pulses communicated on a clock line 50 to the individual element of the microcomputer system of FIG. 1.

What may be termed as a "machine" instruction is loaded into an instruction register 52. The contents of the instruction register is applied to the mapping ROM 34 to, in turn, generate the address of the first microinstruction which must be executed to perform the required function (specified by the instruction held by the instruction register 52). A branch to this address occurs through the microprogram controller. Several microinstructions may be executed such as, for example, fetching data from a main memory (not shown), performing arithmetic or logic operations (by the processor unit 12), testing for overflow or other status indications, and so forth. Then a branch will be made back to, for example, an instruction fetch cycle. At this point, there may be branches to other sections of the microcode. For example, the machine might receive an interrupt at one of the interrupt controller inputs to obtain an interrupt service routine address from the IVP 38.

B. The Microprogram Controller

The microprogram controller 10 is shown in FIGS. 2A and B. That portion of the microinstruction contained in the pipeline register 20 (FIG. 1) that serves as a controller instruction is received by the microprogram controller 10 at the I inputs and communicated to the instruction (INST) inputs of a programmable logic array (PLA) 60. The instruction word received at the INST inputs of the PLA 60 is a 7-bit word, 5 bits of which are the actual instructions that are used by the microprogram controller 10 to select the address of the next microinstruction to be executed. As will be seen, certain instructions are unconditional in the sense that their execution depends only on the instruction. Other instructions have an effect which is partially controlled by an external, data-dependent condition. Accordingly, in this last case, the PLA 60 receives at a condition sensing (COND) input the product of an exclusive-OR gate 62 which receives at its inputs, the signal applied to the POL and CC inputs of the microprogram controller 10. Depending upon the state of the signal applied to the COND input, the PLA 60 will direct the address generating capability of the microcontroller 10 accordingly by issuing appropriate control signals that ultimately result in an 8-bit address being formed at the $A_0$ output of the microprogrammer 10. These control signals, labeled ACTL, SCTL, CCTL, RSTA, PACTL, DIS and OCTL will be described further in conjunction with the element or elements they control.

The PLA 60 receives the clock signal generated by the system clock 48 (FIG. 1) and received at the CP input of the microprogram controller 10 via a signal line 64 connected to the clock (CL) input of the PLA. The clock signal is used by the PLA 62 generate load signals for various registers and latches used to temporarily store information in the microprogram controller 10, as described below.

An internal data bus 66 is provided to receive and conduct the data signals received at the DATA IN inputs of the microprogram controller 10. Four bits of the received information are conducted on the signal line 66a to a 4-bit command latch 68 and a 4-bit N-way register 70. The command latch 68 holds information, that is conducted to the PLA 60 via signal lines 72, that dictate the conditions under which the device will operate, such as, for example, single or double pipeline operation or whether or not an interrupt will be disregarded.

FIG. 3 illustrates the information stored in the command latch 68 and the outputs CL1-CL4 from each stage. One stage (DP) contains information dictating whether or not the mode of operation of microprogram controller 10 will be single or double pipeline. When the output CL1 is HIGH, operation is to be double pipeline. A second stage (ACK) determines whether or not MINTR signal will be acknowledged; when CL2 is HIGH, all MINTR signals will be processed, as will be seen below.

The N-way register 70 contents are used, as will be seen, for providing the address modification capability for executing a branch to N different microinstructions where N can assume any value from 0–8. The N-way register 70 content is applied via the signal lines 71 to an N-way control logic 74, used to effect the branching, as will be seen below.

The internal data bus 66 is also coupled to the inputs of an 8-bit binary down counter 76, clocked by signals generated by the PLA 60 and conducted on the signal line 78. One use of the counter 76 is to provide looping control through a microinstruction sequence, branching from the loop occurring when the counter 76 has reached zero. Accordingly, the counter output lines 80 are applied to a zero detect circuit 82 which senses the zero state of the counter 76 and notifies the PLA 60 via a signal on a signal line 84 to the counter zero (CZ) input of the PLA 60.

The internal data bus 66 is also applied to one operand input (A) of an adder 86. The other operand input (B) receives the output line 88 from an A-multiplexer (AMUX) 90. The carry-out ($C_o$) output of the adder carries a signal on conductor 87 to the test carry (TC) input of the PLA 60.

The results of any add or substract operation performed by the adder circuit 86 are conducted from its outputs O by the bus lines 92 to a six-to-one multiplex (CMUX) 94. The CMUX 94 also receives signal line 96 which communicates all zeros for selection, the internal data bus 66, bus lines 98 which conduct the contents of a program address (PA) register 100 to the CMUX 94, bus lines 102 that conduct data from a last-in-first-out (LIFO) stack 104 to the CMUX 94, and the bus lines 106 that conduct the output of a program address (PA) incremator 108. A CMUX control (CCTL) signal is generated by the PLA 60 and conducted to the CMUX 94 via signal line 110 to effect which set of bus lines 66, 92, 96, 98, 102, or 106 that are to be passed to its output bus 112. In addition, signals are received by the CMUX from the N-way control logic 74, via signal lines 75, function, when appropriate, to select a number (specified by N) of lower order bits of the bus lines 98 are to be substituted with data conducted on the corresponding bus lines of the internal data bus 66.

The eight signal lines forming the output bus 112 of CMUX 94 are communicated to one of three sets of inputs of an output multiplexer (MUX) 120. Another set of inputs of the output MUX 120 is received from an interrupt latch 122 via bus lines 124. The interrupt latch 122 is used to temporarily hold microinstruction addresses for a specified subroutine when an interrupt request is received by the microprogram controller 10. Interrupt addresses that are stored in the interrupt latch 122 are communicated thereto by the internal data bus 66, after receipt at the DATA IN input terminals of processor 10.

The third set of input lines to the output MUX 120 communicates the contents of the PA register 100 via the PA bus lines 98. It is this signal path from the PA register 100, via bus lines 98, to the output MUX 120 that establishes a double pipeline mode of operation, which will be described more fully below. The output MUX 120 receives, from the PLA 60, on signal lines 126, the output control (OCTL) signals which affect selection of a particular set of the buses 98 or 112 that are passed to the output bus 128 of the output MUX 120, coupling the signals to a set (of eight) of three-state output buffers 130. A select interrupt latch (SIL) signal, generated by internal logic 160, is applied to the output MUX 120 to effect selection for the output bus 128. The three state output buffers 130 receive the signal lines selected by the output MUX 120 and couple them to the address output ($A_o$) terminals of the processor 10 via an address output bus 132.

The address out bus 132 conducts eight signals to the $A_o$ output terminals of the processor unit 10. A ninth signal line 134 is received from a single stage three-state buffer 136 which, in turn, receives an output from page select logic 138. The page select logic 138 is, in essence, a flip-flop which can be set or reset by the select (SEL) signal received from the PLA 60 via the signal line 140. Memory locations of the microprogram memory 14 (FIG. 1) can be divided into "pages", containing 256 memory locations each. The signal generated by the page select logic 138, and communicated to the $A_o$ terminals via the three-state buffer 136 and signal line 134 selects the appropriate page; while the address signals passed to the address output bus 132 determine the memory location within the selected page.

The three state buffers 130 and 136 are enabled by a HIGH applied to an output enable (OE) terminal of the processor unit 10 and conducted to the respective three-state buffers by the signal line 142 through OR gate 143 and the signal line 143a. A HIGH on the signal line 142 enables the outputs of the three-state buffers 130 and 136, placing on the $A_o$ terminals of the processor 10 the address generated and selected by the output MUX 120 and page select logic 138. When the signal at the OE input terminal is a LOW, the outputs of the three-state output buffers 130 and 136 are in the high impedance state and address signals may then be applied to the address bus 16 (FIG. 1) by the IVP 38 to select the next microinstruction.

The bus lines 132, in addition to conducting the outputs of the three-state output buffers 130 to the $A_o$ terminals, are also connected to the interrupt vector (IV) increments 144 which increments (i.e., adds a 1 to) the address supplied by the IVP 38. The output lines 146 of the IV incrementer 144 are supplied to one set of inputs of a program address multiplexer (PAMUX) 148. The other two inputs received by PAMUX 148 are respectively, the bus lines 112 from the CMUX 94 and bus lines 106 from the PA incrementer 108. The PAMUX 148 selects between the three sets of bus lines applied thereto, under the control of a PA control (PACTL) signal communicated on control bus 149 from the PLA 60, to pass the selected signals on bus lines 150 to the PA register 100.

The PA incrementer 108 receives and increments by one the address of the microinstruction presently held in the PA register 100 when the processor 10 is operating in single or double pipeline modes. However, communication of the address to be incremented by the PA incrementer 108 from the PA register 100 depends upon the mode of operation. Accordingly, an incrementer multiplexer (IMUX) 152 is provided, controlled by an CL1 signal from the command latch 68 (indicative of single or double pipeline operation) to select which of two bus lines are to be conducted to the PA incrementer 108 by the IMUX 152 via signal lines 154. When the processor unit 10 is operating in the single pipeline mode, the output bus lines 112 of the CMUX 94, which are coupled to the single pipeline (SP) inputs of the IMUX 152 are selected. In double pipeline mode, the bus lines 98 which come directly from the PA register 100 and are applied to the double pipeline (DP) inputs of the IMUX are selected and passed to the output bus lines 154 for application to the PA incrementer 108.

The PA register 100 receives the (periodic) clock (CLK) signal from the CP input terminal of the microprogram controller 10. With each LOW to HIGH transition of the CLK signal, the PA register 100 accepts and stores the information then present in the bus lines 150.

The interrupt requests received from the interrupt controller 36 and emergency interrupt generator 37 at the respective UNINTR and MINTR inputs of the microprogram controller 10 and communicated to the interrupt inputs ($I_1$ and $I_2$) of interrupt logic 160. The interrupt logic 160 then codes the received interrupt (i.e., defining whether it is the UNITR or MINTR interrupt) and generates select A or B (SA/B) signals that are communicated on signal lines 162. As will be seen, the interrupt routine causes the contents of certain of the registers to be stored in the LIFO stack 104, which can be retrieved later. The information stored provides an address linkage return to the microinstruction sequence that the microprogram controller 10 was in when it received an interrupt request.

In addition to the SA/B signals, the interrupt logic generates an output disable (OD) signal that is conducted by the OR gate 143 to the three-state buffers 130 and 136 to place them in their high-impedance state. Also generated by the interrupt logic 160 are PUSH A and PUSH B signals that command the LIFO stack 104 to store certain information, which will be discussed below with reference to FIG. 28.

Interrupt logic 160 also receives certain signals that disable its ability to detect and respond to the MINTR signal. These disabling signals include a disable (DIS) signal from the PLA 60, a stack full (STKF) signal from the LIFO stack 104, and an interrupt disable (IND) from the IND input of the microprogram controller 10. Each of these disabling signals DIS, STKF and IND will be discussed below; their use in the interrupt logic 160 will be discussed with reference to FIG. 28.

In order to ensure that all information needed to establish the linkage back to the sequence interrupted, yet proceed with the branching and execution of the subroutine to which the branch occurs, all information is stored in one clock period. Accordingly, certain of the information is temporarily latched in the A and B latches 164 and 166, respectively, which are then communicated to the LIFO stack 104 via a stack multiplexer (MUX) 170. The A and B latches 164 and 166 receive the clock (CLK), provided at and communicated from the CP input terminal, at their enable (EN) inputs. Information is stored in the A and B latches every clock (instruction) cycle; but the stored information is used only when an interrupt signal is received, as will be discussed below.

Under the control of the stack control (STCL) signals conducted from the PLA 60 to the stack MUX 170, the stack MUX 170 selects one of eight (8 line) signal buses, and passes the selected bus signals bus to the LIFO stack 104 via the stack bus 174. Thus, via the stack MUX 170, the contents of the counter 76, the N-way register 70, the data presently on the internal data bus 66, the contents of the PA register 100, the output of the PA incrementer 108, or the output lines 105 of the LIFO stack 104 are selected for storage.

In addition, when an interrupt signal (MINTR or UINTR) is received, the SA/B signals from the interrupt logic 160 force the stack MUX 170 to select first the B latch 166, and then the A latch 164, for the contents of the selected latch to be conducted to the LIFO stack 104.

The LIFO stack 104 itself includes a random access memory (RAM) 180 that receives 8-bit data words at its data inputs ($D_I$) and stores the words at memory locations specified by an address supplied by a stack pointer 182 via (5) address lines 184. In essence, the stack pointer 182 is an up-down counter. Each time an information word is to be stored in the RAM 180, a PUSH signal is generated by the PLA 60 and communicated to the LIFO stack 104, through the OR gate 183, where it is applied to the count up (CU) input of the stack pointer 102. The output of the OR gate 183 is also coupled to the RAM 180 and used as a read/write signal applied to the read/write (R/W) terminal of the RAM 180 to control read/write operations.

The PUSH A and PUSH B signals generated by the interrupt logic 160 are also communicated to the LIFO stack 104, via the OR gate 183 to effect read operations.

A stack register 186 acts as the top of the stack. Each write operation into the LIFO stack 104 consists of storing the written word in the stack register 186 and, at the same time, storing the word previously written in the stack register 186 in the RAM 180. Thus, the stack register 186 output lines form the stack output bus 102. When the LIFO stack 104 is "popped", the memory location specified by the stack pointer 182 is read and the contents of the memory location communicated to the stack register 186 via the stack output bus 105 and stack MUX 170.

Although not specifically shown in FIG. 2B, it will be evident to those skilled in the art that the signals supplied to the CD and CU inputs are also coupled to the stack register 186 to load the data selected and supplied by the stack MUX 170. In addition, note that the bus 105 supplies the $D_o$ outputs of the RAM 180 to the stack register 186 via the stack MUX 170. When a PUSH is made, the data supplied and stored in the stack register 186 comes from the RAM 180.

As will be seen, when an interrupt request signal (i.e., UNITR or MINTR) is received by the microprogram controller 10, a test must be made to see if the LIFO stack 104 has sufficient room for storing the address linkage necessary to return to the microinstruction sequence. Accordingly, a stack test logic circuit 190 receives the stack pointer address generated on the signal line 184 and, if sufficient room in the RAM 180/stack register 186 combination does not exist, issues a stack full (STKF) signal which is communicated to the interrupt logic 160, where a determination made as to whether the interrupt should presently be serviced.

Briefly, operation of the microprogram controller 10 proceeds as follows: During normal, single pipeline operation, the CMUX 94 receives on the control lines 110 CCTL signals that select the signals on the signal bus 98 from the PA register 100. At the same time, the OCTL signal on the control bus 126 causes the output MUX 120 to select the signal bus 112 from the CMUX 94. Accordingly, the address contained by the PA register 100 and sitting at the output thereof, is communicated to the address output ($A_o$) terminals of the microprogram controller 10 (the output buffers 130 and 136 being held in an enabled state).

At the same time, the output of the CMUX 94 is coupled to the SP input of the IMUX 152 which, under the CLI control signal, passes the CMUX output signals to the PA incrementer 108. The incremented address is conducted from the PA incrementer 108 on the signal lines 106 which are selected by the PAMUX 148 and finally, via the signal lines 150, to the inputs of the PA register 100. Accordingly, at the end of the present address generating cycle, the PA register 100 is enabled by the CLK signal to store the incremented address in the PA register 100. The incremented address, after the delay time it takes to pass through the CMUX 110, output MUX 120 and output buffers 130, forms the address for the next microinstruction contained in the microprogram memory 14 (FIG. 1).

The double pipeline mode of operation increases the speed with which the microprogram memory can execute a sequential selection of microinstructions. The single pipeline mode of operation, described above, results in a microinstruction being set up at the inputs of the pipeline register 20 (FIG. 1) by an address contained in the PA register 100. This can be better illustrated in FIG. 4A. Normal sequential operation results in the PA register 100 being clocked each instruction cycle to accept the address incremented by one as the next address supplied to the microprogram memory 14 via the CMUX 94, output MUX 120, and output buffers 130. The address is applied to the microprogram memory 14 and, an access time later, the microinstruction will be sitting at the inputs of the inputs of the pipeline register 20. The next clock will latch the microinstruction in the pipeline register 20 and the new incremented address latched in the PA register 100 which again filters down to access the next sequential microinstruction contained in the microprogram memory.

In the single pipeline mode, there is a certain time period that necessarily occurs from the point in time that a microinstruction is loaded into the pipeline register 20 to the time that the next sequential microinstruction is ready on the microinstruction bus 18 for input to the pipeline register 20. This time period occurs when the microinstruction is loaded into the pipeline register 20 as follows: The microinstruction is coupled back to the I and DATA IN inputs (FIG. 1) of the microcontroller 10. The instruction received at the I input must filter through the PLA 60 to generate the appropriate control signals that manipulate the flow of the address signals received at the DATA IN inputs, which must pass through the CMUX 94, the output MUX 120, the output buffers 130, and be applied to the microprogram memory 14. Also, the microprogram memory adds an access time from the application of the microinstruction address signals to the appearance of the microinstruction signals on the microinstruction bus 18, conducted to the pipeline register 20. Double pipeline mode reduces the time it takes from the loading of one microinstruction into the pipeline register 20 until a next microinstruction is ready for loading.

Illustrated in FIG. 4B is the address path of double pipeline mode. It will be understood that the control signals (ACTL etc.) are set by the PLA 60 or made active to initiate the multiplexer selection illustrated in FIG. 4B for double pipeline mode operation. A portion of the microinstruction held in the pipeline register 20 is, as before, coupled back to the microprogram controller 10 via the controller instruction and data buses 24, 28, respectively (FIG. 1), and used to generate a microinstruction address via the decoding done by PLA 60. This new address, after a certain time delay, appears at the signal lines 150 and is applied to the PA register 100. However, this setup time is for generating, not the next sequential microinstruction address, but the next sequential microinstruction address plus 1. The next sequential microinstruction address is presently contained in the PA register 100 and is applied, via the output MUX 120, output buffers 130, to the microprogram memory 14. The next sequential microinstruction address waits for loading into the pipeline register 20 on the microinstruction bus 18.

At the end of the present microinstruction and start of the next sequential microinstruction, the pipeline register 20 receives the next microinstruction, the PA register 100 receives the address of the next microinstruction plus 1. Note that now, the time required for the next microinstruction plus 1 to appear on the microinstruction bus 18 requires only the delay time for the address passed through the output MUX 120, the output buffers 130, and the access time of the microprogram memory. In parallel with this setup time is the address generation time. Accordingly, it can be seen that the double pipeline mode approximately halves the time required for analysis of the microinstruction contained in the pipeline register 20 to the setup of the next microinstruction on the microinstruction bus 18.

However, there is a caveat that must be noted: The user must be aware of which mode of operation he is in. In the double pipeline mode, the microinstruction presently in the pipeline register 20 generates a microinstruction address that is ultimately loaded in the pipeline register 20 two microinstructions later; whereas, in single pipeline mode, the content of the pipeline register 20 causes an address to be generated, resulting in the selected microinstruction to immediately follow the one presently contained by the pipeline register 20. In previous microprogram controllers or sequencers, this single/double pipeline operation capability has severely hampered a user's ability to conveniently handle interrupt requests. The present invention, on the other hand, automatically considers the mode of operation and proceeds accordingly, without intervention by the user.

C. The Instruction Set

The following instructions are used by the microprogram controller to select the address of the next microinstruction to be executed. As will be seen, certain of the instructions are unconditional; that is, instruction execution depends only upon the instruction itself. However, execution of many of the following instructions is partially controlled by an external, data-dependent condition; specifically, the execution of these instructions depend upon the state of the signal applied to the COND input of the PLA 60 (FIG. 2A). Also, certain of the instructions have an effect which is partially controlled by the contents of the counter 76.

In the conditional instructions, the result of a data dependent test (executed by the processor unit 12 of FIG. 1) would appear on the CT output of the processor unit and conducted to the CC input of the microprogram controller 10 via the status signal line 32 (FIG. 1). The polarity of the signal received at the CC input can be complemented by a microinstruction that controls the state of the signal applied to the POL input of the microcontroller 10 via the exclusive-OR gate 62. For the purposes of the following discussion of the instructions, it will be assumed that the signal applied to the POL input of the microprocessor 10 is always LOW. Accordingly, the COND input to the PLA 60 corresponds to the data dependent test signal received at the CC input of the microprogram 10. If the signal received at the CC input is a HIGH, the test is considered to have been passed, and the action specified by the instruction occurs. Alternately, if the test has failed, the CC input will be a LOW and an alternate action (specified in the instruction—often the execution of the next sequential microinstruction) occurs. Often, a microinstruction will require one of two possible actions, conditioned upon the signal received at the COND input of the PLA 60, and it will be desired that a specific option be selected.

The following instructions are described with reference to the individual instruction diagrams illustrated in FIGS. 5-26 and are to be taken in conjunction with FIGS. 2A and 2B. Bit assignments used in the 5 bits to identify the particular instruction are contained in parenthetical expressions that accompany each instruction diagram.

Conditional Jump Zero (CJZ): The CJZ instruction (FIG. 5) specifies that the address of the next microinstruction is zero. This feature is typically utilized for power up sequences for the circuitry, which sequences begin at the microprogram memory word location zero. This instruction will cause the PLA 60 to operate the CMUX 94 to effect selection of the ZERO address of the signal lines 96 for application to the microprogram memory 14. The microinstruction contained at the ZERO memory location would be the first of, perhaps, a series of microinstructions that would initialize various counters, registers of not only the microprogram controller (such as, counter 76, stack pointer 182, etc.) but also perform any housecleaning operations required by the processor unit 12. In addition, the CJZ instruction causes the PLA 60 to generate the RSTA signal used to reset the interrupt logic 160, as will be explained below.

Push PA/Conditional Load Counter (PSH): The PSH instruction (FIG. 6) is used for setting up loops in microprogram execution. When the PSH instruction is in the pipeline register 20, a PUSH will be made onto the stack 104 with the address of the next sequential microinstruction (i.e., address 52). The PUSH is executed by selecting the output signal line 106 from the PA incrementer 108 via the signal lines SCTL applied to the stack MUX 170 and communicated to the input of the stack register 186. The stack register 186 is enabled (by a signal from the PLA 60—not shown) simultaneously with a write operation to the RAM 180. Thus, as information is read into the stack register 186, the previous information in the stack register 186 is written to the RAM. The stack pointer is then incremented by the PUSH signal to its CU input. Note that when a PUSH occurs, the value pushed is always the next sequential instruction address; in this case, the address 52.

The counter 76, on the other hand, may or may not be loaded, depending upon the signal state at the COND input of the PLA 60. If the counter 76 is to be loaded, that information accompanies the microinstruction and is communicated to the counter 76 via the controller data bus 28 and the internal data bus 66. The counter is enabled via a signal communicated thereto on the signal line 78 from the PLA 60. Operation in the double pipeline mode is identical.

Conditional Push Counter/Load Counter (PCL): When the PCL instruction (FIG. 7) is in the pipeline register 20, the counter 76 will be loaded with the information presently sitting on the internal data bus 66 (which, again, must accompany the microinstruction). Depending upon the state of the signal applied to the COND input of the PLA 60, the contents (before the load operation) of the counter 76 may be pushed onto the LIFO stack 104; selection of the stack 104 being made by the appropriate state of the SCTL signal from the PLA 60 to the stack MUX 170.

Conditional Set Or Reset Page Bit (SRP): The signal generated by the page select logic 138 is selected by the SRP instruction (FIG. 8). A flip-flop contained in the page select logic 138 will be set or reset via a signal communicated to the SEL input, via the signal line 140, from the PLA 60 when the microinstruction is in the pipeline register 20.

Conditional Enable/Disable Interrupt (EDI): The EDI instruction, illustrated in FIG. 9, functions to generate the DIS signal that is communicated from the PLA 60 to the interrupt logic 160. Upon receipt and identification (i.e., decoding) of an EDI instruction by the PLA 60, a flip-flop (not shown) is set or reset, depending upon the state of the signal at the COND input; the DIS signal is taken from the Q output of the flip-flop.

Conditional Load Stack Pointer Or Load Interrupt Latch (LSI): The LSI instruction (FIG. 10) either loads the stack pointer 182 with the 5 (lower order) bits of the internal data bus 66 or causes the interrupt latch 122 to be loaded with the 4 (lower order) bits of the internal data bus, upon COND input.

Load N-Way/Conditional Push (LNS): The LNS instruction (FIG. 11) will always cause the N-way register 70 to be loaded with 4 bits of information presently on the 4 lower order bit signal lines 66a of the internal data bus 66. Simultaneously, if the signal applied to the COND input of the PLA 60 so dictates, the prior content of the N-way register 70 is pushed onto the LIFO stack 104 via the stack MUX 170.

Conditional Push Data/Pop (PDP): The PDP instruction (FIG. 12) can be used to load parameters on the LIFO stack 104 for two-way jumps. When the PDP instruction is in the pipeline register 20 (FIG. 1), information presently on the internal data bus 66 (communicated thereto from the pipeline register 20 via the controller data bus 28) will be loaded in the stack register 186 (of the LIFO stack 104) at whatever address the stack pointer 182 presently contains. Alternately, (depending upon the state of the signal applied to the COND input of the PLA 60) the LIFO stack 104 is "popped" by decremating by 1 the stack pointer 182. This causes the RAM 180 to be accessed, the data appearing at the data output ($D_o$) and communicated via the signal lines 105 and stack MUX 170 to the stack register 186. The instruction is executed in the same manner in both single and double pipeline modes.

The PDP instruction of FIG. 12, and the remaining instructions, should be interpreted in the following manner: The intent is to show the microprogram flow as various microprogram memory words are executed. For example, the PDP instruction of FIG. 12 indicates a microinstruction sequence having addresses in the microprogram memory 14 of 50, 51, 52, 53 and 54. The circle 190 indicates that instruction 51 is the target instruction, i.e., the PDP instruction. Instruction 51, discussed as above, is assumed to be presently contained in the pipeline register 20. Previously contained instruction prepared by the user will not test for any data dependent condition, resulting in the signal received at the CC input remaining LOW; and, at the same time, the instruction will force the signal received at the POL input HIGH (or leave it in a LOW state, as the case may be) to establish the desired conditional state of the signal received by the PLA 60 at the COND input. In the example in FIG. 12, instruction 52 will follow instruction 51, presently in the pipeline register 20, at the next clock cycle, just as instruction 51 had followed instruction 50.

Conditional Jump To Subroutine Data Bus-Stack (JSDS): FIGS. 13A and 13B respectively illustrate the microinstruction sequence taken to branch to one of two available subroutines, subroutine A (beginning with a microinstruction located at address 70 of the microprogram memory 14) or subroutine B (located at address 80). Execution of the JSDS instruction, illustrated as the instruction numbered 52 in the diagram of FIG. 13A, must be preceded by an earlier microinstruction (here, the microinstruction at address 51) that PUSHed the address of the first microinstruction of subroutine A onto the LIFO stack 104. Thus, the microinstruction at address 51 of the microprogram memory 14 would, when contained in the pipeline register 20, cause the address "70" to be communicated via the internal data bus 66 and stack MUX 170 and pushed onto the LIFO stack 104; that is, the microinstruction at address 51 would probably be a PDP instruction with the appropriate condition applied to the CC input of the microprogram controller 10 and the appropriate data applied to the DATA IN inputs.

When the microinstruction at address 52 is in the pipeline register 20, the internal data bus 66 will carry signals indicative of the address "80", while signal lines 102 from the stack register 186 will conduct address 70, to the CMUX 94. The PLA will recognize the JSDS instruction, sample the COND input, and effect selection of either the internal data bus 66 or the signal lines 102 (from stack register 186) via the CMUX 94 to pass either address "80" or "70", respectively, to the microprogram memory 14.

At the same time, however, address linkage must be established to allow return from the selected subroutine A or B. Accordingly, execution of the JSDS microinstruction by the microprogram controller 10 includes PUSHing the address that is in the PA incrementer 108 onto the LIFO stack 104 by stack MUX 170 selection and control. Thus, PUSHed onto the stack is the present content of the PA register 100 (i.e., address 52) incremented: address 53. This establishes a linkage back to the interrupted subroutine. A return-from-subroutine (described below) returns the microprogram flow to address 53. Thus, this instruction provides the ability to select one of two subroutines to be executed based on a test condition. All jump-to-subroutine instructions executed in the single pipeline mode establish return address linkage in this manner.

The execution of the JSDS microinstruction in the double pipeline mode is basically the same. However, there is a one microinstruction delay. This delay is caused by the particular pipeline mode address path. Referring for the moment specifically to FIGS. 4B and 13B, assume the pipeline register 20 contains the instructions accessed from memory location 51 of the microprogram memory (assumed here to be a PDP instruction for PUSHing address "70" onto the LIFO stack 104). Contained in the PA register 100 is the address for the next sequential microinstruction, i.e., address "52"—the target instruction—which now addresses the microprogram memory 14 and the JSDS instruction sits on the microinstruction bus 18 ready to be loaded into the pipeline register 20. At the next clock time, the pipeline register receives the JSDS instruction, but loaded into the PA register 100 is address 52 incremented by one, or address 53. Thus, while the instruction located at the microprogram memory 14 address 52 (i.e., the JSDS instruction) is in the pipeline register 20 and used by the microprogram controller 10 to select the microinstruction address that starts subroutine A or subroutine B, the microinstruction at address 53 appears on the microinstruction bus 18. Accordingly, the microinstruction at address 53 is loaded into the pipeline register 20, executed, and then the jump taken to either the address 80 of the microprogram memory 14 or the address 70. All jump-to-subroutine instructions executed in the double pipeline mode perform return address linkage storage in this same manner.

Three-Way Branch, Counter Not Equal To Zero (TWBC): The TWBC instruction provides for testing of both a data dependent condition and the counter 76 during one microinstruction and provides for selecting among one of three microinstructions addresses as the next microinstruction to be performed. A previous instruction (i.e., a PSH instruction, see above) will have loaded a count (N) into the counter 76 while pushing a microbranch address onto the LIFO stack 104. This is done by address 51 in the example shown in FIG. 14A. The TWBC instruction (at address 54 of FIG. 14A) performs a decrement in the counter 76 and branch to the instruction address at the top of the LIFO stack 104 (i.e., address 52) until one of two things occur: the count in the counter 76 finally equals zero or the COND input to the PLA 60 changes to a particular state. Until one of these two conditions occur, the next microinstruction address ("52") is taken from the top of the LIFO stack 104. If the count in counter 76 reaches zero (while the microinstruction of address "52" is in the pipeline register 20), the next microinstruction address is taken from the PA register 100 (i.e. address "53"). If, on the other hand, the state of the signal at the COND input of the PLA 60 changes to the jump condition, the next address will be taken from pipeline register 20 via the controller data bus 28, internal data bus 66 and (in response to the CCTL signals from the PLA 60) the CMUX 94.

When the loop is ended, either by the count of the counter 76 becoming ZERO, or by the conditional test (indicated by the signal on the COND input of PLA 60), the LIFO stack 104 is POPPED by decrementing the stack pointer 182, since interest in the value contained at the top of the stack is then complete.

FIG. 14B illustrates the double pipeline mode. Note that the target instruction (here, instruction 53) precedes any actual branch by one microinstruction.

Conditional Jump Data Bus And Pop (JPDP): The JPDP instruction provides another technique for looped termination and stack maintenance. The example in FIG. 15 shows a loop being performed from address 56 back to address 52. Instruction 51 pushes onto the stack the address 52. The instructions at addresses 53, 54 and 55 are all conditional JUMP and POP instructions. At address 53, if the signal at the COND input is of a particular state, a branch will be made to the address 60 (supplied via the internal data bus 66) and the stack will be properly maintained via a POP, since the address 52 is no longer needed. Similarly, the microinstructions at addresses 54 and 55 are also JPDP instructions which will be subsequently executed, subject to the state of the signal at the COND input of PLA 60. An instruction sequence as described here, using the JPDP instruction, is very useful when several inputs are being tested and the microprogram is looping, waiting for any one of the inputs being tested to occur before proceeding to another sequence of instructions. Execution of the JPDP instruction is identical in both single and double pipeline modes of operation.

Conditional Jump Data Bus/Stack (JDS): The JDS instruction is a jump to an address provided by the LIFO stack 104 or the pipeline register 20 (i.e., via the data bus 66). The example of FIG. 26 assumes the pipeline register 20 will supply the value of 90 when the microinstruction at address location 52 of the microprogram memory 14 is being executed. The address "70" has been pushed onto the stack 104 by the microinstruction at address 51. Operation in the double pipeline mode is identical, except the target microinstruction is delayed one microinstruction.

Conditional Jump to Subroutine Via Data Bus (JSRD): The JSRD instruction derives a branch address from the pipeline register 20 via the internal data bus 66 and CMUX 94. This instruction provides a technique for branching to various microprogram sequences depending upon the signal applied to the COND input of the PLA 60. When the contents of the microprogram memory 14 (at address location 51) are in the pipeline register 20, the next address will be either location 52 or location 70 in the example of FIG. 16. When the signal at the COND input is in one binary state, the address appearing on the internal data bus 66 will be selected for application to the microprogram memory 14. At the same time, the output line 106 of the PA incrementer 108 is pushed onto the LIFO stack 104 to provide return linkage to the microinstruction sequence. This instruction is identical in the double pipeline mode, with the exception that the jump is executed one microinstruction later, as described above.

Conditional Return (RET): The RET instruction, as the name implies, is used to branch from a subroutine back to the microinstruction address following the subroutine call or completion of an interrupt subroutine. Since this instruction is conditional, the return is conditioned upon the state of the signal applied to the COND input of the PLA 60. The example in FIG. 17 depicts the use of the RET instruction in both the conditional and the unconditional modes. This example first shows a jump-to-subroutine (such as one of those discussed above) at instruction location 52 where control is transferred to location 70, containing the first microinstruction of the subroutine, simultaneously with a push of the value 53 of the LIFO stack 104. At location 73 of the subroutine, is a RET instruction. If the state of the signal applied to the COND input of the PLA 60 is true, the LIFO stack is accessed and the program will transfer to the next microinstruction address 53. If, however, the signal state of the COND input is otherwise, the microinstruction addresses 74, 75, and 76 will be executed. The microinstruction address 76 can be an unconditional RET to force a return branch to the address location 53 by programming the microinstruction (at location 76) to force the output of the exclusive-OR gate 62 in FIG. 2A to a HIGH by setting the POL signal to a HIGH. It should be remembered that the signal applied to the CC input of the microprogrammer 10 will always be a LOW unless a microinstruction initiates a test that, in turn, causes the CT output of the processor unit 12 to go HIGH.

In the double pipeline mode, execution of the RET instruction is essentially the same, except that the branch is performed one microinstruction later.

Execution of the RET instruction causes generation of the RSTA signal that is applied to the interrupt logic 160. The RSTA signal resets various flip-flops show in (FIGS. 27 and 28) in the interrupt logic 160 to their initial states, as will be discussed below.

Conditional Jump To Data Bus (JPD): The JPD instruction (FIG. 18) provides the capability to take the branch address from the data bus. Thus, when the JPD instruction (address 52 in FIG. 18) is contained in the pipeline register 20, one of the two addresses (depending upon the state of the signal on the COND input of the PLA 60) is in the instruction field that is communicated by the controller bus 28 to the DATA IN inputs of the microcontroller 10 and from there, via the internal data bus 66, to the CMUX 94. Depending upon the signal applied to the COND input of the PLA 60, the CCTL signals will cause the CMUX 94 to select either the internal data bus 66 or the address supplied by the PLA register 100 (shown as address 53, the target instruction incremented), via the signal lines 98, to be the next microinstruction address.

Conditional Jump N-Way (JNW): Utilizing the contents of the N-way register 70, a jump can be executed by merging certain bits provided on the data bus 66, selected under the direction of the contents of the N-way register 70, with the address supplied by the PA register 100. Referring to FIG. 19, assume that prior to the execution of the target instruction (here, located at address 51) the N-way register is loaded with the value "4" by, for example, an LNS instruction (FIG. 11, above). Assume now that the target instruction (located at address 51 of the microprogram memory 14) has now been loaded into the pipeline register 20. The data field communicated via the controller data bus 28 to the DATA IN inputs would carry the address "XXXX1100" (the Xs being indicative of don't cares). On the output lines 98 of the PA register is the address 51 (i.e., 00110011). When the PLA 60 recognizes the JNW instruction, an enable (EN) signal is communicated to the N-way control logic 74, which receives signals on the output lines 71 from the N-way register 70. The value held by the N-way register 70 (i.e., 4) is decoded by the N-way control logic 74 and, upon being enabled by the EN signal, communicates the decoded information via the signal lines 75 to the CMUX 94 to select that number of LOW order bits of the data bus 66 specified by the contents of the N-way register 70. At the same time, the PLA 60, via the CCTL signals applied to the CMUX 94, selects the signal lines 98 from the PA register 100. However, only the higher order 4 bits of the signal lines 98 are actually passed to the CMUX output lines 112; the signals communicated on the signal lines 75 from the N-way control logic 74 inhibit selection of the four lower order bit lines of the signal lines 98. Accordingly, the address ultimately applied to the microprogram memory 14 is formed from the high order 4 bits provided by the PA register (i.e., 0011) and the low order 4 bits of the data bus 66, (i.e., 1100) for a combined addressed of (00111100) or 60. Note that, in addition, the combined address appearing on the CMUX output lines 112 are coupled back, via the IMUX 152, PA incrementer 108 and PA mux 148, to appear on the signal lines 150 as the new address plus one (61). At the next instruction cycle, the address 61 will be loaded into the PA register and used to address the microprogram memory 14.

Conditional Jump N-way To Subroutine (JSNW): The JSNW instruction (FIG. 20) is essentially the same as the JNW instruction, previously discussed, except that address linkage is provided to allow return to the present of microinstruction sequence. Thus, when the microinstruction at location 51 is in the pipeline register 20, the output of the PA register 100 (address is) is PUSHed onto the LIFO stack 104, in single pipeline mode. In double pipeline mode, it will be remembered, the PA incrementer 108 output is PUSHed. The JNSW instruction is executed identically to that discussed with respect to the JNW instruction.

Repeat Loop, Counter ≠ ZERO (RLCZ): The RLCZ microinstruction makes use of the decrementing capability of the counter 76. To be useful, the microinstruction immediately preceeding the first microinstruction of the loop must load a count value (N) into the counter 76 and PUSH the address on the output lines 106 of the PA incrementer 108 onto the LIFO stack. Thus, as FIG. 21 illustrates, the loop includes the four microinstructions located at memory locations 51, 52, 53 and 54 of the microprogram memory. The microinstruction at the memory location 50 would be a PSH instruction (FIG. 6, above) which PUSHES onto the LIFO stack 104 the address (51) and loads the counter with a count value of "N". The RLCZ instruction is at memory location 54 and, each time the instruction is executed, the counter 76 is decremented. The count held by the counter 76 is applied to a zero detect circuit 82 via output lines 80 and, when a zero count is detected, a signal indicative of the zero count detection is communicated on signal line 84 to the CZ input of the PLA 60. In turn, the PLA 60 will issue CCTL signals to the CMUX 94, selecting the address provided by the PA register 100 for communication to the $A_0$ outputs of the microprogram controller 10 to leave the microinstruction loop. The LIFO stack 104 is POPed by decrementing the stack pointer 102.

If, however, the count value of the counter 76 is not equal to zero when the PLCZ microinstruction is in the pipeline register 20, the CCTL signals issued by the PLA 60 to the CMUX 94 will select the address supplied by the LIFO stack 104 (i.e., the output lines 102 of the stack register 186) to be used as the microprogram memory 14 address, causing a return to the microinstruction at memory location 51.

Repeat PL, Counter ≠ZERO (RPCZ): The RPCZ instruction is similar to the RLCZ instruction except the branch address now comes from the pipeline register 20 via the data field supplied on the controller data bus 28 to the DATA IN of the microprogram controller 10, rather than from the LIFO stack 104. When the count value contained in the counter 76 is not equal to zero, the next microinstruction address is obtained from the address applied to the DATA IN inputs of the microprogram controller 10. Accordingly, the PLA 60 causes the CMUX 98 to select the internal data bus 66, and the counter 76 is decremented. When the counter 76 finally reaches a count value of ZERO, the PLA 60 is so notified via the signal applied to the CZ input and the CMUX selects the content of the PA register 100, causing control to fall through to the next sequential microinstruction. This instruction does not perform a POP because the LIFO stack 104 is not being used.

The double pipeline mode, in addition to the usual one microinstruction delay, requires some further consideration in the execution of the RPCZ instruction by referring to FIG. 22B.

Test End Of Loop (TEL): The microinstruction illustrated in FIG. 23, TEL provides the capability of conditionally exiting a loop at the bottom; that is, this is a conditional instruction that cause the microprogram to loop, via the address provided by the LIFO stack 104, if the signal applied to the COND input of the PLA 60 is of one particular state. If the signal is of another particular state, the program will continue to the next sequential microinstruction (here illustrated as the microinstruction located at address 56). The example illustrated in FIG. 23 begins at the microinstruction located at address 50, a PSH instruction for the address 51 onto the top of the LIFO stack 104. The microinstructions located at addresses 51, 52, 53, 54 and 55 will continue to be executed as long as the signal applied to the COND input of the PLA 60 is set to a predetermined state. As long as this predetermined state exists, the address for the next sequential microinstruction, when the microinstruction at address located 55 is in the pipeline register 20, will be taken from the top of the LIFO stack 104. However, once the predetermined state disappears, the loop is terminated and the microinstruction at address 56 is entered into the pipeline register 20. While the microinstruction located at address 55 is in the pipeline register 20, the LIFO stack 140 is POPed, thus accomplishing the required stack maintenance since the address 51 is no longer needed.

Test Stack Pointer (TSP): It will often be necessary, when a subroutine that requires use of a certain number of memory locations of the LIFO stack 104, to initially determine whether the LIFO stack can be used without losing information. Accordingly, the TSP instruction, illustrated in FIG. 24, makes this test. As the example is FIG. 24 illustrates, the microinstruction at memory location 52 could have been one of the conditional jumps to a subroutine such as, for example, the JSNW instruction of FIG. 20, above. Jumps to subroutines necessarily establish an address linkage by PUSHing onto the stack the address for the next microinstruction of the interrupted sequence. As will be seen, such a PUSH is also executed when handling interrupts. In any event, when the microinstruction at address 52 is in the pipeline register 20, the address value "53" has been PUSHed onto the LIFO stack 104, and the address 70 generated for application to the microprogram memory 14 and a jump to the subroutine C (FIG. 24) effected. Assume, for the moment, that the subroutine C requires the use of N memory locations of the LIFO stack 104. Thus, the instruction at memory location 70 is a TSP instruction and would include in the data field that is applied to the DATA IN inputs of the microprogram controller 10 the (binary) value of N. Upon recognizing the TSP microinstruction, the PLA 60 will select the address lines 184 from the stack pointer 182 to be pased via the AMUX 90 to the adder 86. The stack pointer 182 count is then added in the adder 86 to the signals appearing on the internal data bus 66 (i.e., N). If there are insufficient memory locations in the LIFO stack 104, a carry out (CO) signal from the fifth bit location of the adder 86 will be generated by the addition performed by the adder 86 and will appear on the carry out ($C_0$) output of the adder and be communicated to the test counter (TC) input of the PLA 60 via the signal line 87. The subroutine C cannot be executed without losing information from the LIFO stack 104 and, accordingly, the next microinstruction address will be taken from the top of the LIFO stack 104 to return control to the main program at address 53. If, on the other hand, sufficient room exists, the $C_0$ output of the adder 86 will become inactive and the next sequential address will be obtained from the output of the PA incrementer 108, passed through the PAMUX 148, at the next clock, loaded into the PA register 100.

Not discussed in detail is a Load Interrupt Address (LIA) which loads the interrupt latch 122 which is the address that will be used when a UINTR interrupt signal is received.

Nor is the Load Command

It is apparent that other instructions could be added to the instruction set. However, the above instructions amply illustrate operation of the microprogram controller 10 to provide and modify addresses, as the case may be. The next section will discuss the ability of the microprogram controller to branch subroutines other than and those specified by the instructions discussed above, to handle interrupts.

D. Interrupt Handling

The receipt of either of the interrupt signals, UNITR or MINTR by the interrupt logic 160 at its $I_1$, $I_2$ inputs is latched by the interrupt detect circuit 200, a part of the interrupt logic 160 illustrated in FIG. 27. As shown, a pair of flip-flops 202, 204 receive on their clock (C) inputs the CLK signal. The flip-flop 202 receives at its data (D) input the signal generated by the OR gate 206 which can be either the UINTR signal or the Q output of the flip-flop 202 to provide the latching.

In similar fashion, the data (D) input of the flip-flop 204 receives the output of the OR gate 208. Inputs to the OR gate 208 include the Q output of the flip-flop 204 and the signal provided by the AND gate 210. Coincidence between the MINTR signal and the NOR gate 212 output will establish whether or not the Q output of flip-flop 204 will be set to a HIGH or a LOW. If the output of the NOR gate 212 is HIGH (i.e., enabling the AND gate 210) the flip-flop 204 will be set upon receipt of the next LOW to HIGH transition of the signal applied to its C input if the MINTR signal is HIGH (indicating and interrupt request).

The interrup flip-flop 204 may be disabled by either an external interrupt disable (IND) signal or by the determination made at the AND gate 214. The IND input terminal to the microprogram controller 10 allows interrupts to be masked by external control. Thus, if the IND signal is HIGH, the output of the NOR gate 212 will be LOW, disabling the AND gate 210 and, in turn, preventing the flip-flop 204 from being set.

The AND gate 210 may also be disabled by signals generated internally of the microprogram controller 10. In order to provide return linkage to the interrupted program sequence, certain address information must be saved in order to return to the program after the interrupt has been serviced. This requires that there be at least a certain minimum amount of memory space in the LIFO stack 104 available. If the LIFO stack 104 is full to the point that information will be lost if an attempt is made to service the interrupt, the interrupt cannot be handled. Referring momentarily to FIG. 2B, the stack test logic 190 continually monitors the output lines 184 of the stack pointer 182. If the content of the LIFO stack 104 reaches a predetermined count, as indicated by the stack pointer 182, the stack test logic 190 will issue a stack full (STKF) signal that is conducted to the AND gate 214 and used to disable the AND gate 210 so that the interrupt detect circuit 200 ignores the interrupt request transmitted via the MINTR signal.

However, the situation may arise when the user does not care whether or not information will be lost and, accordingly, considers the LIFO stack 104 to always have sufficient storage space. In this instance, the user may program the microprogram controller 10 to disregard the STKF signal by loading a 4-bit data word into the command latch 68 (via, for example, the LCS instruction, FIG. 25 above), setting the ACK stage to a ONE OR HIGH (FIG. 3). The CL2 signal is communicated to the AND gate 214 (via the inverter 215), disabling the AND gate 214. Accordingly, not withstanding the state of the STKF signal, all interrupts received via the MINTR signal will be answered.

It is also desirable to disable the flip-flop 204 from being set while address linkage information is being stored in the LIFO stack 104. Additionally, it is preferable that the UINTR signal be given priority. Accordingly, the UINTR signal is applied to an inverter 215, the output of which disables the AND gate 210. When the interrupt generated storing operation starts, a storing start (SS) signal is generated and applied to the NOR gate 212 which, in turn, disables the AND gate 210, inhibiting receipt and detection of any MINTR signal.

Disabling receipt and detection of the MINTR signal is also caused by the DIS signal from the PLA 60 and applied to the NOR gate 212. The DIS signal, when HIGH, causes the output of the NOR gate 212 to go LOW, disabling the AND gate 210.

When either of the interrupt flip-flops 202 or 204 are set, an interrupt request (INR) signal is generated by ORing the Q outputs of an flip-flops via the OR gate 218, producing the INR signal. When the interrupt routine is ended, a reset (RSTB) signal is generated by an interrupt controller 222, discussed below with reference to FIG. 28, that is passed through the OR gate 220 and communicated to the reset (R) inputs of the flip-flops 202, 204 to return them to their reset state. The OR gate 220 also receives the RSTA signal from the PLA 60, generaged in response to a CJZ instruction, to reset the flip-flops 202 and 204.

When the flip-flop 204 is set (by receipt of the MINTR signal, the Q output becomes the OD signal that places the 3-state buffers 130 and 136 in their HIGH impedance state. In addition, the Q output of the flip-flop 204 is passed through a buffer 219 to become the INTA signal that enables (via its OE input) the IVP 38 (FIG. 1). In the case of a UINTR signal, Q output of the flip-flop 202 is used as the SIL signal to force the output MUX 120 to select the interrupt latch 122 as the address supplied to the microprogram memory 14. Receipt of the UNITR signal does not disable the output buffers 130 and 136, and does not enable the IVP 38 by generating a INTA signal, as is the case when a MINTR signal is received.

Referring now to FIG. 28, the interrupt controller 222 is shown. Interrupt controller 222 functions to generate those internal signals necessary for selecting and storing address linkage for returning to normal program sequence after an interrupt subroutine is completed.

As FIG. 28 illustrates, the INR signal generated by the interrupt detect circuit 200 is suplied to a one-shot (OS) circuit 224 which, in return, generates a pulse that is coupled to an AND gate 226. The pulse width of the pulse generated by the OS 224 should be at least as long as one instruction cycle (i.e., the period of the CLK signal). The output of the AND gate 226 is supplied to the data input (D) of a flip-flop 228. A second input to the AND gate 226 is supplied by the Q output of the flip-flop 228.

The Q output of the flip-flop 228 (which is the complement of the Q output) is coupled to a three input AND gate 230 which receives at its other two inputs the CL1 output of the command latch 68 and the Q output of a flip-flop 232. The output of the AND gate 230 supplies the data input (D) of the flip-flop 232. The CLK signal is received at the clock inputs (C) of both of the flip-flops 228 and 232 and both also receive the RSTA signal from the PLA 60 at their respective reset inputs (R). The Q output of the flip-flops 228 and 232 are coupled to a decoder 234, which also receives the CLK signal, to produce the RSTB signal (that resets the interrupt detect flip-flop 202 or 204), the SA/B signals that select via the stack MUX 170), and the PUSH A and PUSH B signals that increment the stack pointer 182, via the OR gate 183 (FIG. 2B). The Q outputs of the flip-flops 228 and 232 are also coupled to a NAND gate 236 which generates the SS signal that is used to inhibit receipt of the MINTR signal by the interrupt detect circuit 200, via the NOR gate 212 disabling the AND gate 210 (FIG. 27).

The interrupt controller 222 functions as follows: Typically, operation of the microcontroller 10 is commenced with the execution of a CJZ instruction which, in turn, through the PLA 60, generates the RSTA signal that resets the flip-flops 228 and 232 to their ZERO states (i.e., Q outputs HIGH). Until the INR signal is received, the output of OS 224 is LOW, as is the Q output of the flip-flop 228. Accordingly, both AND gates 226 and 230 are disabled, causing LOWs to be supplied to the D inputs of the flip-flops 228 and 232. The flip-flops remain in this condition, not withstanding receipt of the CLK signal, until a pulse is received from the OS 224.

Upon detection of either the MINTR or UNITR signals by the interrupt detect logic 200, the INR signal will be generated and supplied to the OS 224 which, in turn, provides a HIGH to the corresponding input of the AND gate 226. This places a HIGH on the D input of the flip-flop 228. When the next CLK pulse is received by the flip-flop 228, the Q output goes HIGH and the Q output goes LOW. The next CLK pulse will return the flip-flop 228 to its ZERO state, since the Q output of flip-flop 228 disables the AND gate 226, placing a LOW on the D input. While the Q output of the flip-flop 228 is HIGH, however, the SA/B signals force stack MUX 170 to select the B latch 166 as a source to the LIFO stack 104 (FIG. 2B) and issuing a PUSH B signal to PUSH the contents of the B latch onto the stack.

The CLK pulse that resets the flip-flop 228 may also cause the Q output of the flip-flop 232 to go HIGH. The flip-flop 232 indicates that the microprogram controller 10 is operating in the double pipeline mode and an additional piece of information must be stored in order to properly return the interrupted program sequence, as will be explained below. If operation is in the double pipeline mode, the CL1 input to the AND gate 230 will be HIGH; and with the HIGH from the Q output of the flip-flop 228, as well as that of the Q output of the flip-flop 232, places a HIGH at the D input of the flip-flop 232 so that it will be set upon receipt of the CLK pulse that resets the flip-flop 228. The following CLK pulse will reset the flip-flop 232 since the AND gate 230 is disabled by the Q output of the flip-flop 232.

The particular sequence of states that the flip-flops 228 and 232 go through are decoded by the decoder 234 and used to generate the aforementioned signals. For the single pipeline mode, the signals SA/B are generated so that the B latch is passed by the stack MUX 170 to the stack register 186 and stored with a PUSH B signal. Thereafter, the RSTB signal is generated to reset the interrupt detect circuit 200. In double piepline mode, the SA/B signal is generated to select the contents of the B latch 166 to be conducted via the stack MUX 170 to the stack register 186, as with the single pipeline mode operation. Additionally, and on the next CLK pulse, the SA/B signals force selection of the A latch 164 and, via the stack MUX 170, PUSHes the contents of the A latch onto the stack 186 with the generation of the PUSH A signal. Then the RSTB signal is created to reset the interrupt detect circuit 200.

Referring now to FIG. 29A, diagrammatically illustrated is a sequence of operations performed by the interrupt logic 160 while the microprogram controller 10 is operating in the single pipeline mode. Interrupt handling during double pipeline mode of operation is discussed with reference to FIG. 29B, below.

FIG. 29A illustrates a program sequence 330 that comprises microinstructions located at address locations 51-55. During normal (i.e., interrupt free) operation, each microinstruction at the designated address in the microprogram memory 14 is loaded into the pipeline register 20 and executed. Thus, for example, at time $T_1$ (with the LOW to HIGH transition 331 of the CLK signal), the pipeline register 20 is loaded with the microinstruction located at address "51". The respective fields (e.g., instruction, data and the like) are conducted to the microprogram controller 10 via, for example, the controller instruction and data buses 24 and 28, respectively. Some time later, at time $T_{1+x}$, the address value "52" is formed by the microprogram controller 10 and communicated to the address circuits (not shown) of the microprogram memory 14. Then, on the next LOW to HIGH transition 333 of the CLK signal, the microinstruction located at address "52" is loaded into the pipeline register 30. Again, the address of the next sequential microinstruction (i.e., "53") begins to form at the address circuits of the microprogram memory 14.

Normally, each microinstruction of the program sequence 330 would be accessed in turn. It must be (and is) assumed, however, that this sequence can be interrupted at any time by the receipt of a MINTR or UINTR signal, in turn necessitating a call of a subroutine to handle the interrupt. This call breaks the normal program sequence and information must be retained to enable a return to the proper microinstruction so that the program sequence can be completed.

Assume that during the time the microinstruction at address 51 is in the pipeline register 20, a MINTR signal is received. The next LOW to HIGH transition 333 of the CLK signal loads the microinstruction at address 52 into the pipeline register 20; the flip-flop 204 (FIG. 27) is set, causing the Q output to go high, in turn generating the OD signal to disable the 3-state output buffers 130 and 136 (placing them in their impedance state) and causing the INTA signal to be issued. The INTA signal enables the IVP 38. At the same time, an address is being supplied to the address circuits (not shown) of the IVP 38 by the interrupt controller 36 (FIG. 1) on the bus 41, identifying the interrupt address.

The IVP 38 will generate the address of the first microinstruction of the subroutine that will be used to handle the specified interrupt. The address so generated is conducted on the vector address bus 42 to the address bus 16. Thus, at time $T_{2+x}$, the address being formed by the microprogram controller 10, i.e., address "53", disappears with the disabling of the output buffers 130 and 136, to be replaced by the interrupt subroutine address "100" supplied by the IVP 38. At the time T₃, with the LOW to HIGH transition 334 of the CLOCK signal, the instruction at memory location 100 will be loaded into the pipeline register 20 and a jump made to the interrupt subroutine.

Before the jump is made, however, address linkage for the return to the program sequence 330 must be established. With every LOW to HIGH transition of the CLK signal, the information then appearing on the output lines 112 of the CMUX 94 is loaded into the B latch 166. At the same time, the signal information on the output lines 98 of the PA register 100 is loaded into the A latch 164. At time T₃ the address which would have been used by the microprogram controller 10 but for the interrupt i.e., address "53", is loaded in the B latch 166. At the same time, the flip-flop 228 (FIG. 28) is set and decoder 234 issues on the SA/B signal lines, the signal that forces the stack MUX 170 to select the B latch 166. At time T₄, the interrupt control circuit 222 issues the PUSH B signal from the decoder 234 to PUSH the contents of the B latch 166 onto the LIFO stack 104. Thus, address "53", the location of the next microinstruction to be executed when a return to the program sequence 330 is made, is stored. The last instruction of the interrupt subroutine will be a RET instruction which will return to the microinstruction located at address "53".

If the microinstruction located at address 52 had been a jump-to-subroutine (such as, for example, the JSDS or JSRD instructions) the microinstruction is executed in normal fashion (as described above with reference to the discussion of the instructions), resulting in the address "53" being PUSHed onto the LIFO stack 104 at time T₃. However, appearing at the output of the CMUX 94, during execution of the microinstruction at location 52, is the address (J) of the subroutine to which the jump would have been made. The subroutine address (J) is stored in the B latch 166, as before, and, at time T₄, PUSHed onto the LIFO stack 104. Completion of the interrupt subroutine by a RET instruction will POP the LIFO stack and, in effect, execute the jump to the subroutine originally specified by the microinstruction at address "52". Completion of that subroutine will again POP the stack to effect return to the program sequence to at address "53".

Double pipeline mode is essentially the same. One further piece of information is PUSHed onto the LIFO stack 104. Referring to FIG. 29B (taken in conjunction with FIG. 4B), assume that the program sequence 330a is now being executed by the microprogram controller 10 in the double pipeline mode. When the microinstruction at address location "52a" is in the pipeline register 20, the address "53a" is in the PA register 100 and is being supplied via the output MUX 120 and output buffer 130 to the microprogram memory 14. Assume further that the microinstruction in the pipeline register 20 (from location "52a") is a jump-to-subroutine microinstruction, such as, for example, a JSDS instruction (FIG. 13B, above). Normal execution of the instruction will cause, at time T'₃, the information appearing on the bus lines 106 (from the PA 108) to be PUSHed onto the LIFO stack. At the same time, forming on the bus lines 112 from the CMUX 94 is the jump (subroutine) address (Ja) from the CMUX 94, which would have been applied to the microprogram memory 14 had it not been for receipt of the MINTR signal (at time T'₁₊ₓ). When the address "54a" is PUSHed onto the LIFO stack 104, per normal instruction execution, the jump address (Ja) is latched by the B latch 166 and the output of the PA register 100 (the next sequential microinstruction address, "53a") is latched in the A latch 164.

In the time period between times T'₂ and T'₃, the output buffers 130 and 136 have been disabled and the next microinstruction address is supplied by the IVP 38, as explained in reference to single pipeline mode. Thus, at time T'₃, a jump is made to address "100a", the address of the first microinstruction of the interrupt subroutine. At time T'₄, the SA/B signals from the interrupt controller 222 (FIG. 28) force the stack MUX 170 to pass signal on the bus line 168 from the B latch 166 to the stack register 186 and a PUSH B signal is issued, PUSHing the contents of the B latch 166 onto the LIFO stack 104. At time T'₅ the SA/B signals force the stack MUX 170 to pass the signals on the bus line 169 from the A latch 164 to the stack register 186 and a PUSH A signal is issued from the interrupt controller 222 to PUSH the contents of the A latch 168 onto the LIFO stack 104.

At the end of the subroutine, in double pipeline mode, two sequential RET microinstructions must be used. The first RET microinstruction retrieves the address "53a" so that the instruction located therein can be executed, and POPs the LIFO stack 104 for stack maintenance. At the time the address "53a" (in double pipeline mode) is being applied to the microprogram address memory 14, the second sequential RET microinstruction of the interrupt subroutine is in the pipeline register 20, causing the LIFO stack 104 to again be POPed to retrieve the pump address (Ja) previously stored. Thus, the address that will follow "53a" will be the address Ja, and the jump to the subroutine that would have been made had it not been for the interrupt, is now made.

In both single and double pipeline modes, when the address supplied by the IVP 38 is conducted to the microprogram memory 14 it is also supplied, via the bus lines 132, to the IV incrementer 144 in the microprogram controller 10. From there, if in single pipeline mode, it is conducted via the bus lines 146, the PA MUX 148, bus lines 150, to the PA register 100 and loaded in the PA register 100 at the next CLK time (i.e., LOW to HIGH CLK transition) and become the next sequential microinstruction address of the interrupt subprogram supplied to the microprogram memory 14.

When a UINTR signal is received, the same procedure described above with respect to the MINTR signal receipt, is performed, with the following differences: First, no upper INTA signal is issued. It is assumed that a UINTR signal is an emergency situation and will always be handled. Further, the address for the interrupt routine is obtained from the interrupt latch 122. When the UINTR signal is received and the flip-flop 202 is set, the SIL signal goes HIGH (FIG. 27). Activation of the SIL signal forces the output MUX 120 to select and pass the bus lines 124 from the interrupt latch 122 to the microprogram memory 14 via the output buffers 130. The remainder of the interrupt handling sequence is identical to that described above.

We claim:

1. A microprogram controller having output means for generating through said output means microinstruction address signals used to access a program memory element containing a plurality of microinstructions, there being a first register means connected to said memory element for receiving and temporarily holding microinstructions accessed from said memory element by said microinstruction address signals and bus means for communicating a portion of said accessed microinstruction from said first register means to said microprogram controller, said microprogram controller comprising:

input means connected to said bus means for receiving instruction words and data words;

decode means connected to said input means for receiving said instruction words to generate therefrom a plurality of control signals;

first address generating means, having second register means and incrementing means operably interconnected to provide sequentially incremented address signals;

storage means responsive to said control signals for selectively storing address signals; and first multiplex means, connected to said input means, said first address generating means and said storage means, for selectively coupling said input means, said first address generating means, and said storage means to said output means in response to said control signals, said first address generating means and said storage means further connected to a first multiplex output terminal means for receiving signals therefrom in response to said control signals;

whereby said microinstruction address signals are generated.

2. The microprogram controller of claim 1, wherein said microprogram controller is responsive to an interrupt signal said microprogram controller further comprising interrupt means for receiving said interrupt signal and for generating therefrom gating signals that inhibit communication of the next sequential address signals to be generated through said output means and to cause to be stored said next sequential address signals in said storage means, said interrupt means including means for generating interrupt address signals and for communicating said interrupt address signals to said memory element.

3. The microprogram controller of claim 2, wherein said interrupt means includes means for determining the number of address signals stored in said storage means and for inhibiting response said interrupt signal upon a predetermined number of said address signals stored in said storage means.

4. The microprogram controller of claim 2, wherein said interrupt address generating means includes latch means coupled to said input means for receiving and temporarily holding said interrupt address signals, said second multiplex means including means for selectively coupling said latch means to said output means in response to said gating signals.

5. The microprogram controller of claim 2 further connected to a second memory element containing a plurality of interrupt addresses and means for selecting a predetermined one of said interrupt addresses when said interrupt signal is generated, wherein said interrupt means includes means for enabling said predetermined interrupt address to be accessed from said second memory element to provide said interrupt address signals at said output means.

6. The microprogram controller of claim 5, wherein said microprogram controller further comprises interrupt address incrementing means connected to said output means for receiving and incrementing said predetermined interrupt address signals, and for communicating said incremented interrupt address signals to said second register means.

7. The microprogram controller of claim 1 further comprising second multiplex means connected between said multiplex means and said output means, for selectively coupling said first multiplex means to said output means.

8. The microprogram controller of claim 7, wherein said microprogram controller is responsive to an interrupt signal; and wherein said microprogram controller further comprises means for receiving said interrupt signal and for generating therefrom gating signals that inhibit communication of the next sequential address to said output means and to cause to be stored the next sequential address signals to be generated through said output means and to cause to be stored said next sequential address signals in said storage means, said interrupt means including means for generating interrupt address signals and for communicating said interrupt address signals to said memory element.

9. A microprogram controller having output means for generating through said output means microinstruction address signals used to access a program memory element containing a plurality of microinstructions, there being a first register means connected to said memory element for receiving and temporarily holding a microinstruction accessed from said memory element by said microinstruction address signals and bus means for communicating a portion of said microinstruction from said first register means to said microprogram controller, said microprogram controller comprising:

input means connected to said bus means for receiving instruction words and data words;

decoder means connected to said input means for receiving said instruction words to generate therefrom a plurality of control signals;

first address generating means to provide sequentially incremental address signals from received address signals;

storage means responsive to said control signals for selectively storing address signals;

first multiplex means, connected to said input means, said first address generating means and said storage means, for selectively coupling said input means, said first address generating means and said storage means to an output terminal means; and second register means connected to said first multiplex output terminal means for temporarily holding address signals from said first multiplex means, and for providing address signals to said first address generating means and to said output means;

whereby, while said first register means holds the microinstruction of a first address signals, said microprogram controller in operation holds the next sequential address signals in said second register means and forms the third sequential address signals through said first multiplex means.

10. The microprogram controller of claim 9, wherein said microprogram controller is responsive to an interrupt signal; and wherein said microprogram controller further comprises means for receiving said interrupt signal and for generating therefrom gating signals that inhibit communication of the next sequential address to said output means and to cause to be stored the next sequential address signals to be generated through said output means and to cause to be stored said next sequential address signals in said storage means, said interrupt means including means for generating interrupt address signals and for communicating said interrupt address signals to said memory element.

* * * * *